（12) United States Patent
Custers

(10) Patent No.: US 12,338,520 B2
(45) Date of Patent: Jun. 24, 2025

(54) PRE-AGEING SYSTEMS AND METHODS USING MAGNETIC HEATING

(71) Applicant: Novelis Inc., Atlanta, GA (US)

(72) Inventor: David Michael Custers, Inverary (CA)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 17/820,322

(22) Filed: Aug. 17, 2022

(65) Prior Publication Data

US 2023/0002876 A1 Jan. 5, 2023

Related U.S. Application Data

(62) Division of application No. 15/716,577, filed on Sep. 27, 2017, now Pat. No. 11,479,837.

(Continued)

(51) Int. Cl.
*C22F 1/04* (2006.01)
*B21B 39/02* (2006.01)
(Continued)

(52) U.S. Cl.
CPC ............... *C22F 1/04* (2013.01); *B21B 39/02* (2013.01); *B21B 39/34* (2013.01); *B21C 47/16* (2013.01); *B21C 47/18* (2013.01); *B21C 47/3433* (2013.01); *B21C 47/3483* (2013.01); *B21D 22/022* (2013.01); *B21D 37/16* (2013.01);
(Continued)

(58) Field of Classification Search
CPC ......... B21B 39/02; B21B 39/34; B21C 37/02; B21C 47/16; B21C 47/18; B21C 47/3433; B21C 47/3483; B21D 22/022; B21D 37/16; B65G 54/02; B65H 29/006; B65H 29/20; C21D 1/04; C21D 1/42; C22C 21/02; C22C 21/06; C22C 21/10; C22C 21/12; C22F 1/02; C22F 1/04; F27D 2019/0003; F27D 99/0001; H02N 15/00; H05B 6/104; H05B 6/32; H05B 6/36; Y02P 10/253
USPC ....... 219/670, 631, 645, 471, 600, 618, 630, 219/635, 641, 644, 647, 652, 660, 667, 219/671, 672; 148/508, 511, 574
See application file for complete search history.

(56) References Cited

U.S. PATENT DOCUMENTS 1,776,775 A 9/1930 Biggert, Jr.
1,872,045 A 8/1932 Smitmans
(Continued)

FOREIGN PATENT DOCUMENTS

AU 2017335761 B2 6/2019
AU 2017336528 B2 2/2020
(Continued)

OTHER PUBLICATIONS

JP H0527041 U (Year: 1993).*
(Continued)

*Primary Examiner* — Vy T Nguyen
(74) *Attorney, Agent, or Firm* — Kilpatrick Townsend & Stockton LLP

(57) ABSTRACT

Systems and methods of pre-ageing of a metal strip during metal processing include passing the metal strip adjacent a magnetic rotor of a reheater. The systems and methods also include heating the metal strip through the magnetic rotor by rotating the magnetic rotor. Rotating the magnetic rotor induces a magnetic field into the metal strip such that the metal strip is heated.

17 Claims, 8 Drawing Sheets

Related U.S. Application Data

(60) Provisional application No. 62/505,948, filed on May 14, 2017, provisional application No. 62/400,426, filed on Sep. 27, 2016.

(51) Int. Cl.

| | |
|---|---|
| *B21B 39/34* | (2006.01) |
| *B21C 37/02* | (2006.01) |
| *B21C 47/16* | (2006.01) |
| *B21C 47/18* | (2006.01) |
| *B21C 47/34* | (2006.01) |
| *B21D 22/02* | (2006.01) |
| *B21D 37/16* | (2006.01) |
| *B65H 29/00* | (2006.01) |
| *B65H 29/20* | (2006.01) |
| *C21D 1/04* | (2006.01) |
| *C21D 1/42* | (2006.01) |
| *C22C 21/02* | (2006.01) |
| *C22C 21/06* | (2006.01) |
| *C22C 21/10* | (2006.01) |
| *F27D 99/00* | (2010.01) |
| *H05B 6/10* | (2006.01) |
| *H05B 6/32* | (2006.01) |
| *H05B 6/36* | (2006.01) |
| *B65G 54/02* | (2006.01) |
| *C22C 21/12* | (2006.01) |
| *C22F 1/02* | (2006.01) |
| *F27D 19/00* | (2006.01) |
| *H02N 15/00* | (2006.01) |

(52) U.S. Cl.
CPC ......... *B65H 29/006* (2013.01); *B65H 29/20* (2013.01); *C21D 1/42* (2013.01); *F27D 99/0001* (2013.01); *H05B 6/104* (2013.01); *H05B 6/32* (2013.01); *H05B 6/36* (2013.01); *B21C 37/02* (2013.01); *B65G 54/02* (2013.01); *C21D 1/04* (2013.01); *C22C 21/02* (2013.01); *C22C 21/06* (2013.01); *C22C 21/10* (2013.01); *C22C 21/12* (2013.01); *C22F 1/02* (2013.01); *F27D 2019/0003* (2013.01); *H02N 15/00* (2013.01); *Y02P 10/25* (2015.11)

(56) References Cited

U.S. PATENT DOCUMENTS

| | | |
|---|---|---|
| 2,001,637 A | 5/1935 | Talbot |
| 2,041,235 A | 5/1936 | Darbaker |
| 2,058,447 A | 10/1936 | Hazelett |
| 2,058,448 A | 10/1936 | Hazelett |
| 2,092,480 A | 9/1937 | Talbot |
| RE21,260 E | 11/1939 | Hazelett |
| 2,334,109 A | 11/1943 | McBain et al. |
| 2,448,009 A | 8/1948 | Baker |
| 2,448,012 A | 8/1948 | Baker |
| 2,481,172 A | 9/1949 | Staggs |
| 2,494,399 A | 1/1950 | McCleary |
| 2,527,237 A | 10/1950 | Wilcox, Jr. |
| 2,529,884 A | 11/1950 | Reynolds |
| 2,566,274 A | 8/1951 | White et al. |
| 2,722,589 A | 11/1955 | Marquardt |
| 2,731,212 A | 1/1956 | Baker |
| 2,753,474 A | 7/1956 | Walworth et al. |
| 2,769,932 A | 11/1956 | Zozulin et al. |
| 2,895,034 A | 7/1959 | Baffrey et al. |
| 2,912,552 A | 11/1959 | Baermann |
| 3,008,026 A | 11/1961 | Kennedy |
| 3,072,309 A | 1/1963 | Hill |
| 3,184,938 A | 5/1965 | Terwilliger |
| 3,218,001 A | 11/1965 | Gombos |
| 3,272,956 A * | 9/1966 | Baermann ............... C21D 1/42 |
| | | 219/645 |
| 3,344,645 A | 10/1967 | Dario |
| 3,376,120 A | 4/1968 | Hiegel |
| 3,422,649 A | 1/1969 | Lowy |
| 3,431,971 A | 3/1969 | Gyongyos |
| 3,438,231 A | 4/1969 | Petzschke |
| 3,444,346 A | 5/1969 | Russell et al. |
| 3,453,847 A | 7/1969 | Romanauskas |
| 3,535,902 A | 10/1970 | Sevenich et al. |
| 3,562,470 A | 2/1971 | Bobart et al. |
| 3,604,696 A | 9/1971 | Coleman et al. |
| 3,606,778 A | 9/1971 | Bomberger |
| 3,635,417 A | 1/1972 | Kajiwara et al. |
| 3,746,229 A | 7/1973 | Feller et al. |
| 3,793,867 A | 2/1974 | Safford |
| 3,837,391 A | 9/1974 | Rossi |
| 3,879,814 A | 4/1975 | Mojelski |
| 4,019,359 A | 4/1977 | Smith |
| 4,054,770 A | 10/1977 | Jackson et al. |
| 4,138,074 A | 2/1979 | Ross et al. |
| 4,185,183 A | 1/1980 | Kamimoto |
| 4,214,467 A | 7/1980 | Sankaran |
| 4,291,562 A | 9/1981 | Orr |
| 4,296,919 A | 10/1981 | Sakurai et al. |
| 4,321,444 A | 3/1982 | Davies |
| 4,379,396 A | 4/1983 | Hope et al. |
| 4,448,614 A | 5/1984 | Morimoto et al. |
| 4,485,651 A | 12/1984 | Tippins et al. |
| 4,520,645 A | 6/1985 | Ross et al. |
| 4,708,325 A | 11/1987 | Georges |
| 4,730,781 A | 3/1988 | Richter et al. |
| 4,743,196 A | 5/1988 | Imose et al. |
| 4,761,527 A | 8/1988 | Mohr |
| 4,795,872 A | 1/1989 | Hagisawa et al. |
| 4,828,227 A | 5/1989 | Georges et al. |
| 4,891,484 A | 1/1990 | Waggott et al. |
| 4,923,396 A | 5/1990 | Harada et al. |
| 5,356,495 A | 10/1994 | Wyatt-Mair et al. |
| 5,397,877 A | 3/1995 | Couffet et al. |
| 5,401,941 A | 3/1995 | Mauve et al. |
| 5,701,775 A | 12/1997 | Sivilotti et al. |
| 5,727,412 A | 3/1998 | Tippins et al. |
| 5,739,506 A | 4/1998 | Hanton et al. |
| 5,845,699 A | 12/1998 | Baharis |
| 5,911,781 A | 6/1999 | Vidt |
| 5,914,056 A | 6/1999 | Yamaguchi |
| 5,914,065 A | 6/1999 | Alavi |
| 6,011,245 A | 1/2000 | Bell |
| 6,019,200 A | 2/2000 | Janzen et al. |
| 6,129,136 A | 10/2000 | Tibbs et al. |
| 6,264,765 B1 | 7/2001 | Bryant et al. |
| 6,285,015 B1 | 9/2001 | Doizaki et al. |
| 6,327,883 B1 | 12/2001 | Noe et al. |
| 6,570,141 B2 | 5/2003 | Ross |
| 6,576,878 B2 | 6/2003 | Thorpe et al. |
| 6,776,857 B2 | 8/2004 | Lee |
| 7,257,977 B2 | 8/2007 | Arvedi |
| 7,525,073 B2 | 4/2009 | Lovens et al. |
| 7,671,307 B2 | 3/2010 | Nikanorov et al. |
| 7,726,383 B2 | 6/2010 | Pircher et al. |
| 7,786,693 B2 | 8/2010 | Schmitz et al. |
| 7,819,356 B2 | 10/2010 | Takatsuka et al. |
| 7,926,316 B2 | 4/2011 | Tachibana |
| 7,942,191 B2 | 5/2011 | Zhang et al. |
| 8,502,122 B2 | 8/2013 | Hirota |
| 8,592,735 B2 | 11/2013 | Hirota |
| 9,089,887 B2 | 7/2015 | Snyder et al. |
| 9,248,482 B2 | 2/2016 | Passoni et al. |
| 9,462,641 B2 | 10/2016 | Akers |
| 10,370,749 B2 | 8/2019 | Hobbis et al. |
| 10,508,328 B2 | 12/2019 | Malpica et al. |
| 10,837,090 B2 | 11/2020 | Gaensbauer et al. |
| 10,844,467 B2 | 11/2020 | Gaensbauer et al. |
| 11,072,843 B2 | 7/2021 | Pralong et al. |
| 11,242,586 B2 | 2/2022 | Hobbis et al. |
| 11,377,721 B2 | 7/2022 | Hobbis et al. |
| 11,479,837 B2 | 10/2022 | Custers |
| 11,499,213 B2 | 11/2022 | Hobbis et al. |

(56) References Cited

U.S. PATENT DOCUMENTS

| | | | |
|---|---|---|---|
| 11,785,678 | B2 | 10/2023 | Pralong et al. |
| 11,821,066 | B2 | 11/2023 | Pralong et al. |
| 2003/0198734 | A1 | 10/2003 | Mann |
| 2006/0037989 | A1 | 2/2006 | Zilkenat et al. |
| 2006/0070689 | A1* | 4/2006 | Kropfl .................. C22F 1/04 148/698 |
| 2006/0086726 | A1 | 4/2006 | Yamamoto et al. |
| 2006/0123866 | A1 | 6/2006 | Ho |
| 2007/0151635 | A1 | 7/2007 | Sano et al. |
| 2007/0193322 | A1 | 8/2007 | Beck et al. |
| 2009/0026303 | A1 | 1/2009 | Schmitz et al. |
| 2009/0101636 | A1 | 4/2009 | Lovens et al. |
| 2010/0050730 | A1 | 3/2010 | Buschsieweke et al. |
| 2010/0237548 | A1 | 9/2010 | Okada et al. |
| 2011/0091230 | A1 | 4/2011 | Yamamoto |
| 2011/0095125 | A1 | 4/2011 | Tazoe et al. |
| 2012/0037264 | A1 | 2/2012 | Sakabe et al. |
| 2012/0074132 | A1 | 3/2012 | Chen et al. |
| 2012/0305547 | A1 | 12/2012 | Fukutani et al. |
| 2013/0139929 | A1 | 6/2013 | Francoeur et al. |
| 2014/0147697 | A1 | 5/2014 | Berkhout et al. |
| 2016/0016215 | A1 | 1/2016 | Brown et al. |
| 2016/0348225 | A1* | 12/2016 | Bryant .................. C22C 21/10 |
| 2016/0363164 | A1 | 12/2016 | Kosmicki et al. |
| 2017/0253953 | A1* | 9/2017 | Meyer .................... C21D 1/52 |
| 2018/0085803 | A1 | 3/2018 | Hobbis et al. |
| 2018/0085805 | A1 | 3/2018 | Pralong et al. |
| 2018/0085810 | A1 | 3/2018 | Malpica et al. |
| 2018/0087122 | A1 | 3/2018 | Custers |
| 2018/0087138 | A1 | 3/2018 | Gaensbauer et al. |
| 2018/0092163 | A1 | 3/2018 | Pralong et al. |
| 2018/0092164 | A1 | 3/2018 | Gaensbauer et al. |

FOREIGN PATENT DOCUMENTS

| | | |
|---|---|---|
| AU | 2017336561 | 3/2020 |
| CN | 1190361 A | 8/1998 |
| CN | 1389879 A | 1/2003 |
| CN | 1891363 A | 1/2007 |
| CN | 101394945 A | 3/2009 |
| CN | 101454466 A | 6/2009 |
| CN | 101611316 A | 12/2009 |
| CN | 100584986 C | 1/2010 |
| CN | 101795785 A | 8/2010 |
| CN | 101821031 A | 9/2010 |
| CN | 201596682 U | 10/2010 |
| CN | 102159745 A | 8/2011 |
| CN | 102378427 A | 3/2012 |
| CN | 102415210 A | 4/2012 |
| CN | 102423751 A | 4/2012 |
| CN | 102601115 A | 7/2012 |
| CN | 102649129 A | 8/2012 |
| CN | 102921727 A | 2/2013 |
| CN | 103890216 A | 6/2014 |
| CN | 104507190 A | 4/2015 |
| CN | 104537253 A | 4/2015 |
| CN | 104588430 A | 5/2015 |
| CN | 105073291 A | 11/2015 |
| CN | 105142813 A | 12/2015 |
| CN | 105189791 A | 12/2015 |
| CN | 105339101 A | 2/2016 |
| CN | 108495724 B | 1/2020 |
| DE | 857787 C | 12/1952 |
| DE | 1163760 B | 2/1964 |
| DE | 4213686 A1 | 10/1993 |
| DE | 19650582 A1 | 6/1998 |
| DE | 19524289 C2 | 7/1999 |
| DE | 102006054383 A1 | 5/2008 |
| DE | 102008061356 A1 | 6/2010 |
| DE | 102006054383 B4 | 10/2014 |
| DE | 212017000208 U1 | 4/2019 |
| EA | 012474 B1 | 10/2009 |
| EP | 0742680 A2 | 11/1996 |
| EP | 1221826 B1 | 2/2006 |
| EP | 1604549 B1 | 8/2006 |
| EP | 2112863 A1 | 10/2009 |
| EP | 2157193 A1 | 2/2010 |
| EP | 2233593 A2 | 9/2010 |
| EP | 2434836 A2 | 3/2012 |
| EP | 2478974 A1 | 7/2012 |
| EP | 2233593 B1 | 2/2013 |
| EP | 2800452 B1 | 7/2016 |
| EP | 3393692 B1 | 12/2019 |
| EP | 3520568 B1 | 12/2020 |
| FR | 1347484 A | 12/1963 |
| FR | 1387653 A | 1/1965 |
| FR | 2780846 B1 | 9/2000 |
| GB | 167545 A | 8/1921 |
| GB | 600673 A | 4/1948 |
| GB | 609718 A | 10/1948 |
| GB | 988334 A | 4/1965 |
| GB | 2114101 A | 8/1983 |
| GB | 2121260 A | 12/1983 |
| JP | 4934459 A | 3/1974 |
| JP | 5168460 A | 6/1976 |
| JP | 5469557 A | 6/1979 |
| JP | 56102567 A | 8/1981 |
| JP | 58127558 A | 7/1983 |
| JP | 58193351 A | 11/1983 |
| JP | 58221609 A | 12/1983 |
| JP | 60257926 A | 12/1985 |
| JP | 6486474 A | 3/1989 |
| JP | 026008 A | 1/1990 |
| JP | 02209457 A | 8/1990 |
| JP | 0375344 A | 3/1991 |
| JP | 0375345 A | 3/1991 |
| JP | 04112485 A | 4/1992 |
| JP | 576932 A | 3/1993 |
| JP | 0527041 U | 4/1993 |
| JP | 0527042 U | 4/1993 |
| JP | 0582248 A | 4/1993 |
| JP | 0549117 U | 6/1993 |
| JP | 05138305 A | 6/1993 |
| JP | 05293605 A | 11/1993 |
| JP | 0711402 A | 1/1995 |
| JP | 07328719 A | 12/1995 |
| JP | H07-328719 A | 12/1995 |
| JP | 09122752 A | 5/1997 |
| JP | 11508526 A | 7/1999 |
| JP | 2002529245 A | 9/2002 |
| JP | 2011200889 A | 10/2011 |
| JP | 2012152824 A | 8/2012 |
| JP | 2016141843 A | 8/2016 |
| JP | 6549330 B2 | 7/2019 |
| KR | 20120116988 A | 10/2012 |
| KR | 102010204 B1 | 8/2019 |
| MX | 370035 | 11/2019 |
| RU | 1784319 C | 12/1992 |
| RU | 2333065 C2 | 9/2008 |
| RU | 2353452 C2 | 4/2009 |
| RU | 97889 U1 | 9/2010 |
| RU | 2504574 C2 | 1/2014 |
| RU | 2539962 C2 | 1/2015 |
| RU | 2679810 C1 | 2/2019 |
| RU | 2709494 C1 | 12/2019 |
| RU | 2713926 C1 | 2/2020 |
| SU | 988404 A1 | 1/1983 |
| SU | 1005958 A | 3/1983 |
| SU | 1316725 A1 | 6/1987 |
| WO | 2007138152 A1 | 12/2007 |
| WO | 2008149218 A2 | 12/2008 |
| WO | 2010091865 A1 | 8/2010 |
| WO | 2011102454 A1 | 8/2011 |
| WO | 2012050552 A1 | 4/2012 |
| WO | 2012084638 A1 | 6/2012 |
| WO | 2015094482 A1 | 6/2015 |
| WO | 2016035867 A1 | 3/2016 |
| WO | 2016035893 A1 | 3/2016 |
| WO | 2018064136 A1 | 4/2018 |
| WO | 2018064138 A1 | 4/2018 |
| WO | 2018064145 A1 | 4/2018 |
| WO | 2018064218 A1 | 4/2018 |

(56) References Cited

FOREIGN PATENT DOCUMENTS

| | | |
|---|---|---|
| WO | 2018064221 A1 | 4/2018 |
| WO | 2018064224 A1 | 4/2018 |
| WO | 2018064228 A1 | 4/2018 |

OTHER PUBLICATIONS

"International Alloy Designations and Chemical Composition Limits for Wrought Aluminum and Wrought Aluminum Alloys", The Aluminum Association, Incorporated, Registration Record Series, Teal Sheets, Feb. 1, 2009, 35 pages.
U.S. Appl. No. 15/716,559 , "Advisory Action", Feb. 8, 2021, 4 pages.
U.S. Appl. No. 15/716,559 , "Final Office Action", Nov. 17, 2020, 10 pages.
U.S. Appl. No. 15/716,559 , "Non-Final Office Action", Jun. 23, 2020, 11 pages.
U.S. Appl. No. 15/716,559 , "Notice of Allowance", Apr. 14, 2021, 9 pages.
U.S. Appl. No. 15/716,570 , "Non-Final Office Action", Jun. 21, 2019, 6 pages.
U.S. Appl. No. 15/716,570 , "Notice of Allowance", Oct. 2, 2019, 5 pages.
U.S. Appl. No. 15/716,570 , "Supplemental Notice of Allowability", Nov. 13, 2019, 2 pages.
U.S. Appl. No. 15/716,577 , "Advisory Action", Nov. 16, 2020, 3 pages.
U.S. Appl. No. 15/716,577 , "Advisory Action", Mar. 15, 2022, 5 pages.
U.S. Appl. No. 15/716,577 , "Corrected Notice of Allowability", Jul. 5, 2022, 3 pages.
U.S. Appl. No. 15/716,577 , "Final Office Action", Sep. 17, 2020, 19 pages.
U.S. Appl. No. 15/716,577 , "Final Office Action", Jan. 6, 2022, 20 pages.
U.S. Appl. No. 15/716,577 , "Final Office Action", Oct. 31, 2019, 24 pages.
U.S. Appl. No. 15/716,577 , "Non-Final Office Action", Jun. 24, 2021, 18 pages.
U.S. Appl. No. 15/716,577 , "Non-Final Office Action", Apr. 2, 2020, 19 pages.
U.S. Appl. No. 15/716,577 , "Non-Final Office Action", Apr. 18, 2019, 22 pages.
U.S. Appl. No. 15/716,577 , "Notice of Allowance", Jun. 17, 2022, 15 pages.
U.S. Appl. No. 15/716,577 , "Restriction Requirement", Nov. 19, 2018, 6 pages.
U.S. Appl. No. 15/716,608 , "Corrected Notice of Allowability", Oct. 26, 2020, 2 pages.
U.S. Appl. No. 15/716,608 , "Corrected Notice of Allowability", Sep. 2, 2020, 2 pages.
U.S. Appl. No. 15/716,608 , "Final Office Action", Nov. 29, 2019, 11 pages.
U.S. Appl. No. 15/716,608 , "Non-Final Office Action", May 28, 2019, 11 pages.
U.S. Appl. No. 15/716,608 , "Non-Final Office Action", Mar. 19, 2020, 15 pages.
U.S. Appl. No. 15/716,608 , "Notice of Allowance", Aug. 14, 2020, 10 pages.
U.S. Appl. No. 15/716,608 , "Restriction Requirement", Feb. 26, 2019, 6 pages.
U.S. Appl. No. 15/716,692 , "Corrected Notice of Allowability", Oct. 6, 2020, 3 pages.
U.S. Appl. No. 15/716,692 , "Corrected Notice of Allowability", Sep. 23, 2020, 3 pages.
U.S. Appl. No. 15/716,692 , "Corrected Notice of Allowability", Oct. 15, 2020, 4 pages.
U.S. Appl. No. 15/716,692 , "Final Office Action", Dec. 18, 2019, 14 pages.
U.S. Appl. No. 15/716,692 , "Non-Final Office Action", Jun. 25, 2019, 10 pages.
U.S. Appl. No. 15/716,692 , "Non-Final Office Action", Mar. 24, 2020, 12 pages.
U.S. Appl. No. 15/716,692 , "Notice of Allowance", Aug. 26, 2020, 13 pages.
U.S. Appl. No. 15/716,887 , "Advisory Action", Apr. 8, 2021, 5 pages.
U.S. Appl. No. 15/716,887 , "Final Office Action", Jan. 27, 2021, 21 pages.
U.S. Appl. No. 15/716,887 , "Final Office Action", Nov. 15, 2021, 24 pages.
U.S. Appl. No. 15/716,887 , "Non-Final Office Action", Aug. 21, 2020, 20 pages.
U.S. Appl. No. 15/716,887 , "Non-Final Office Action", Aug. 5, 2021, 23 pages.
U.S. Appl. No. 15/716,887 , "Non-Final Office Action", Jul. 25, 2022, 25 pages.
U.S. Appl. No. 15/717,698 , "Non-Final Office Action", Nov. 6, 2018, 11 pages.
U.S. Appl. No. 15/717,698 , "Notice of Allowance", Mar. 22, 2019, 8 pages.
U.S. Appl. No. 15/717,698 , "Supplemental Notice of Allowability", Jul. 2, 2019, 3 pages.
U.S. Appl. No. 16/448,316 , "First Action Interview Pilot Program Pre-Interview Communication", Mar. 22, 2021, 4 pages.
U.S. Appl. No. 16/448,316 , "Non-Final Office Action", Jun. 8, 2021, 7 pages.
U.S. Appl. No. 16/448,316 , "Notice of Allowance", Oct. 7, 2021, 9 pages.
U.S. Appl. No. 16/448,316 , "Supplemental Notice of Allowability", Nov. 17, 2021, 2 pages.
U.S. Appl. No. 16/448,324 , "Advisory Action", Mar. 14, 2022, 7 pages.
U.S. Appl. No. 16/448,324 , "Final Office Action", Jan. 7, 2022, 9 pages.
U.S. Appl. No. 16/448,324 , "First Action Interview Pilot Program Pre-Interview Communication", Apr. 5, 2021, 4 pages.
U.S. Appl. No. 16/448,324 , "Non-Final Office Action", Jul. 6, 2021, 8 pages.
U.S. Appl. No. 16/448,324 , "Notice of Allowance", Jul. 20, 2022, 7 pages.
U.S. Appl. No. 16/448,330 , "Final Office Action", Dec. 13, 2021, 9 pages.
U.S. Appl. No. 16/448,330 , "First Action Interview Pilot Program Pre-Interview Communication", May 20, 2021, 4 pages.
U.S. Appl. No. 16/448,330 , "Non-Final Office Action", Jul. 14, 2021, 7 pages.
U.S. Appl. No. 16/448,330 , "Notice of Allowance", Mar. 3, 2022, 9 pages.
AU2017335675 , "First Examination Report", Sep. 16, 2019, 3 pages.
AU2017335675 , "Notice of Acceptance", Sep. 7, 2020, 3 pages.
AU2017335675 , "Second Examination Report", Jan. 9, 2020, 3 pages.
AU2017335675 , "Third Examination Report", Jun. 4, 2020, 3 pages.
AU2017335677 , "First Examination Report", Sep. 9, 2019, 3 pages.
AU2017335677 , "Notice of Acceptance", Feb. 27, 2020, 3 pages.
AU2017335758 , "First Examination Report", Sep. 26, 2019, 3 pages.
AU2017335758 , "Notice of Acceptance", Jan. 28, 2020, 3 pages.
AU2017335761 , "First Examination Report", Sep. 18, 2018, 3 pages.
AU2017335761 , "Notice of Acceptance", Feb. 14, 2019, 3 pages.
AU2017335764 , "First Examination Report", Sep. 20, 2019, 4 pages.
AU2017335764 , "Notice of Acceptance", Feb. 12, 2020, 3 pages.
AU2017336528 , "First Examination Report", Jul. 18, 2019, 3 pages.
AU2017336528 , "Notice of Acceptance", Oct. 9, 2019, 3 pages.

(56) References Cited

OTHER PUBLICATIONS

AU2017336561 , "First Examination Report", Sep. 3, 2019, 3 pages.
AU2017336561 , "Notice of Acceptance", Dec. 2, 2019, 3 pages.
BR112018015294-3 , "Notice of Allowance", May 3, 2022.
BR112018015294-3 , "Office Action", Jul. 20, 2021, 4 pages.
BR112019005231-3 , "Notice of Allowance", May 3, 2022,.
BR112019005231-3 , "Office Action", Jul. 27, 2021, 5 pages.
BR112019005273-9 , "Notice of Allowance", May 3, 2022.
BR112019005273-9 , "Office Action", Jul. 27, 2021, 5 pages.
CA3,012,495 , "Notice of Allowance", Dec. 22, 2020, 1 page.
CA3,012,495 , "Office Action", May 23, 2019, 3 pages.
CA3,012,495 , "Office Action", Feb. 13, 2020, 4 pages.
CA3,037,750 , "Office Action", Feb. 7, 2020, 4 pages.
CA3,037,750 , "Office Action", Jun. 15, 2021, 4 pages.
CA3,037,750 , "Office Action", Mar. 11, 2022, 5 pages.
CA3,037,750 , "Office Action", Oct. 27, 2020, 5 pages.
CA3,037,752 , "Notice of Allowance", May 25, 2022, 1 page.
CA3,037,752 , "Office Action", May 12, 2021, 2 pages.
CA3,037,752 , "Office Action", Oct. 25, 2021, 3 pages.
CA3,037,755 , "Notice of Allowance", Nov. 30, 2021, 1 page.
CA3,037,755 , "Office Action", Mar. 3, 2020, 4 pages.
CA3,037,755 , "Office Action", Apr. 23, 2021, 7 pages.
CA3,037,755 , "Office Action", Aug. 18, 2020, 7 pages.
CA3,037,759 , "Notice of Allowance", Jan. 8, 2021, 1 page.
CA3,037,759 , "Office Action", Feb. 7, 2020, 4 pages.
CA3,038,293 , "Notice of Allowance", Dec. 7, 2020, 1 page.
CA3,038,293 , "Office Action", Feb. 17, 2020, 5 pages.
CA3,038,298 , "Office Action", Jun. 3, 2022, 4 pages.
CA3,038,298 , "Office Action", Feb. 17, 2020, 5 pages.
CA3,038,298 , "Office Action", Nov. 27, 2020, 5 pages.
CA3,038,298 , "Office Action", Sep. 27, 2021, 5 pages.
CA3,111,860 , "Office Action", Jun. 23, 2022, 5 pages.
CA3037759 , "First Office Action", Feb. 7, 2020, 4 pages.
CN201780008470.4 , "Notice of Decision To Grant", Nov. 29, 2019, 7 pages.
CN201780008470.4 , "Office Action", Apr. 15, 2019, 13 pages.
CN201780058008.5 , "Notice of Decision to Grant", Jun. 25, 2021, 7 pages.
CN201780058008.5 , "Office Action", Jan. 27, 2021, 9 pages.
CN201780058039.0 , "Notice of Decision to Grant", Mar. 29, 2021, 6 pages.
CN201780058039.0 , "Office Action", Aug. 4, 2020, 15 pages.
CN201780059163.9 , "Notice of Decision to Grant", Jun. 17, 2021, 4 pages.
CN201780059163.9 , "Office Action", Nov. 30, 2020, 21 pages.
CN201780059419.6 , "Notice of Decision to Grant", Mar. 1, 2021, 6 pages.
CN201780059419.6 , "Office Action", Jul. 9, 2020, 13 pages.
CN201780059419.6 , "Office Action", Dec. 4, 2019, 19 pages.
CN201780059427.0 , "Notice of Decision to Grant", May 18, 2022, 4 pages.
CN201780059427.0 , "Office Action", Aug. 4, 2021, 22 pages.
CN201780059427.0 , "Office Action", Feb. 18, 2022, 4 pages.
CN201780059464.1 , "Notice of Decision to Grant", Apr. 29, 2022, 4 pages.
CN201780059464.1 , "Office Action", Oct. 26, 2021, 16 pages.
CN201780059464.1 , "Office Action", Jan. 4, 2021, 8 pages.
CN201780059464.1 , "Office Action", May 27, 2021, 9 pages.
CN202010092737.6 , "Notice of Decision to Grant", Mar. 2, 2022, 6 pages.
CN202010092737.6 , "Office Action", Dec. 29, 2021, 23 pages.
CN202010092737.6 , "Office Action", Jun. 23, 2021, 24 pages.
EP17781603.0 , "Notice of Decision to Grant", Jun. 25, 2020, 2 pages.
EP17783660.8 , "Notice of Decision to Grant", Jul. 2, 2020, 2 pages.
EP17783661.6 , "Notice of Decision to Grant", Nov. 7, 2019, 2 pages.
EP17784736.5 , "Notice of Decision to Grant", Dec. 10, 2020, 2 pages.
EP17784736.5 , "Office Action", Mar. 16, 2020, 4 pages.
EP17784738.1 , "Notice of Decision to Grant", Jul. 9, 2020, 2 pages.
EP17791198.9 , "Notice of Decision to Grant", Jan. 14, 2021, 2 pages.
EP17791198.9 , "Office Action", Mar. 16, 2020, 5 pages.
EP17791203.7 , "Notice of Decision to Grant", Nov. 5, 2020, 2 pages.
EP19208050.5 , "Extended European Search Report", Mar. 5, 2020, 7 pages.
EP19208050.5 , "Notice of Decision to Grant", Sep. 30, 2021, 2 pages.
EP19208050.5 , "Office Action", Dec. 16, 2020, 3 pages.
IN201817026638 , "First Examination Report", Oct. 22, 2019, 7 pages.
IN201917010873 , "First Examination Report", Jul. 15, 2020, 5 pages.
IN201917010875 , "First Examination Report", Jan. 18, 2021, 6 pages.
IN201917010879 , "First Examination Report", Jun. 8, 2020, 6 pages.
IN201917011138 , "First Examination Report", May 18, 2020, 6 pages.
IN201917011139 , "First Examination Report", Mar. 17, 2021, 6 pages.
IN201917011140 , "First Examination Report", Jul. 28, 2020, 7 pages.
IN202118028933 , "First Examination Report", Jun. 15, 2022, 5 pages.
JP2018-538545 , "Notice of Decision to Grant", May 28, 2019, 3 pages.
JP2018-538545 , "Office Action", Jan. 8, 2019, 4 pages.
JP2019-118054 , "Notice of Decision to Grant", Jan. 5, 2022, 3 pages.
JP2019-118054 , "Office Action", Jun. 8, 2021, 14 pages.
JP2019-118054 , "Office Action", Oct. 5, 2021, 5 pages.
JP2019-118055 , "Notice of Decision to Grant", Jan. 5, 2022, 3 pages.
JP2019-118055 , "Office Action", Jun. 8, 2021, 12 pages.
JP2019-118055 , "Office Action", Oct. 5, 2021, 5 pages.
JP2019-118059 , "Notice of Decision to Grant", Jan. 5, 2022, 3 pages.
JP2019-118059 , "Office Action", Jun. 8, 2021, 11 pages.
JP2019-118059 , "Office Action", Oct. 5, 2021, 6 pages.
JP2019-516123 , "Notice of Decision to Grant", Jun. 29, 2021, 3 pages.
JP2019-516123 , "Office Action", Jan. 26, 2021, 5 pages.
JP2019-516123 , "Office Action", May 26, 2020, 8 pages.
JP2019-516450 , "Notice of Decision to Grant", Jan. 12, 2021, 3 pages.
JP2019-516450 , "Office Action", May 26, 2020, 7 pages.
JP2019-516458 , "Notice of Decision to Grant", Feb. 2, 2021, 3 pages.
JP2019-516458 , "Office Action", May 26, 2020, 6 pages.
JP2019-516523 , "Notice of Decision to Grant", Aug. 4, 2020, 3 pages.
JP2019-516523 , "Office Action", Mar. 17, 2020, 10 pages.
JP2019-537056 , "Notice of Decision to Grant", Aug. 3, 2021, 4 pages.
JP2019-537056 , "Office Action", Dec. 22, 2020, 5 pages.
JP2019-537056 , "Office Action", May 26, 2020, 8 pages.
JP2019-537057 , "Notice of Decision to Grant", Mar. 30, 2021, 3 pages.
JP2019-537057 , "Office Action", Dec. 1, 2020, 5 pages.
JP2019-537057 , "Office Action", Apr. 28, 2020, 8 pages.
KR10-2018-7022261 , "Notice of Decision to Grant", May 27, 2019, 4 pages.
KR10-2018-7022261 , "Office Action", Nov. 29, 2018, 11 pages.
KR10-2019-7010818 , "Notice of Decision to Grant", Jan. 7, 2021, 2 pages.
KR10-2019-7010818 , "Office Action", Jul. 25, 2020, 13 pages.

(56) References Cited

OTHER PUBLICATIONS

KR10-2019-7010990, "Notice of Decision to Grant", Jul. 16, 2021, 2 pages.
KR10-2019-7010990, "Office Action", Jul. 25, 2020, 15 pages.
KR10-2019-7010990, "Office Action", Jan. 7, 2021, 3 pages.
KR10-2019-7010992, "Notice of Decision to Grant", Feb. 19, 2021, 1 page.
KR10-2019-7010992, "Office Action", Aug. 13, 2020, 13 pages.
KR10-2019-7011173, "Notice of Decision to Grant", Jul. 21, 2021, 4 pages.
KR10-2019-7011173, "Office Action", Jul. 14, 2020, 13 pages.
KR10-2019-7011173, "Office Action", Jan. 21, 2021, 3 pages.
KR10-2019-7011646, "Notice of Decision to Grant", Feb. 22, 2021, 2 pages.
KR10-2019-7011646, "Office Action", Aug. 13, 2020, 11 pages.
KR10-2019-7011832, "Notice of Decision to Grant", Oct. 27, 2020, 2 pages.
KR10-2019-7011832, "Office Action", Feb. 19, 2020, 21 pages.
KR10-2019-7023026, "Notice of Decision to Grant", Sep. 14, 2020, 2 pages.
MX/A/2018/008898, "Notice of Allowance", Oct. 25, 2019, 2 pages.
MX/A/2018/008898, "Office Action", Mar. 27, 2019, 12 pages.
MX/A/2019/003428, "Notice of Allowance", Jun. 29, 2021, 3 pages.
MX/A/2019/003428, "Office Action", Feb. 3, 2021, 3 pages.
MX/A/2019/003429, "Notice of Allowance", Jun. 30, 2021, 3 pages.
MX/A/2019/003429, "Office Action", Mar. 4, 2021.
MX/A/2019/003430, "Office Action", Jun. 1, 2022, 5 pages.
MX/A/2019/003431, "Notice of Allowance", Jun. 14, 2021, 3 pages.
MX/A/2019/003431, "Office Action", Feb. 3, 2021, 7 pages.
MX/A/2019/003432, "Office Action", Aug. 12, 2020, 8 pages.
MX/A/2019/003433, "Notice of Allowance", Jul. 18, 2022, 3 pages.
MX/A/2019/003433, "Office Action", May 30, 2022, 3 pages.
PCT/US2017/053661, "International Preliminary Report on Patentability", Apr. 11, 2019, 11 pages.
PCT/US2017/053661, "International Search Report and Written Opinion", Dec. 20, 2017, 17 pages.
PCT/US2017/053665, "International Preliminary Report on Patentability", Apr. 11, 2019, 11 pages.
PCT/US2017/053665, "International Search Report and Written Opinion", Dec. 20, 2017, 15 pages.
PCT/US2017/053676, "International Preliminary Report on Patentability", Apr. 11, 2019, 10 pages.
PCT/US2017/053676, "International Search Report and Written Opinion", Dec. 21, 2017, 13 pages.
PCT/US2017/053810, "International Preliminary Report on Patentability", Apr. 11, 2019, 10 pages.
PCT/US2017/053810, "International Search Report and Written Opinion", Dec. 21, 2017, 13 pages.
PCT/US2017/053813, "International Preliminary Report on Patentability", Apr. 11, 2019, 8 pages.
PCT/US2017/053813, "International Search Report and Written Opinion", Jan. 26, 2018, 15 pages.
PCT/US2017/053819, "International Preliminary Report on Patentability", Apr. 11, 2019, 15 pages.
PCT/US2017/053819, "International Search Report and Written Opinion", Feb. 13, 2018, 21 pages.
PCT/US2017/053819, "Invitation to Pay Additional Fees and, Where Applicable, Protest Fee", Dec. 21, 2017, 14 pages.
PCT/US2017/053826, "International Preliminary Report on Patentability", Apr. 11, 2019, 11 pages.
PCT/US2017/053826, "International Search Report and Written Opinion", Dec. 20, 2017, 14 pages.
RU2018126508, "Notice of Decision to Grant", Dec. 3, 2018, 18 pages.
RU2019102889, "Office Action", Jun. 30, 2022, 12 pages.
RU2019107737, "Notice of Decision to Grant", Apr. 20, 2020, 16 pages.
RU2019107737, "Office Action", Jan. 22, 2020, 12 pages.
RU2019107744, "Notice of Decision to Grant", Dec. 18, 2019, 16 pages.
RU2019107744, "Office Action", Nov. 1, 2019, 10 pages.
RU2019108016, "Notice of Decision to Grant", Oct. 22, 2019, 18 pages.
RU2019108080, "Notice of Decision to Grant", Jan. 27, 2020, 15 pages.
RU2019108080, "Office Action", Nov. 28, 2019, 9 pages.
RU2019108096, "Notice of Decision to Grant", May 28, 2020, 17 pages.
RU2019108096, "Office Action", Mar. 11, 2020, 10 pages.
RU2019108096, "Office Action", Nov. 6, 2019, 10 pages.
RU2019108199, "Notice of Decision to Grant", Mar. 25, 2020, 15 pages.
RU2019108199, "Office Action", Jan. 14, 2020, 8 pages.
Zerbetto, "Optimal Design of a Permanent Magnet Heater for Aluminum Billets", Marcello Zerbetto Inovalab s.r.l., Oct. 15, 2014, 23 pages.
BR Application No. BR112019005278-0, "Notice of Allowance", mailed Jul. 25, 2023.
CA Application No. 3,037,750, "Notice of Allowance", mailed Sep. 11, 2023, 1 page.
EP Application No. 17784736.5, "Intention to Grant", Sep. 25, 2020, 7 pages.
Brazilian Application No. BR112019005278-0, "Office Action", Mailed Jul. 19, 2022, 5 pages.
Canadian Application No. 3,037,750, "Office Action", Nov. 25, 2022, 5 pages.
Brazilian Application No. BR112019005278-0, "Office Action", Mailed on Apr. 4, 2023, 5 pages.
Brazilian Application No. BR112019005681-5, "Office Action", Mailed on Apr. 4, 2023, 7 pages.
Japanese Application No. 2021-123464, "Notice of Decision to Grant", Mailed on May 9, 2023, 5 pages.
CN Application No. 202111583292.2, "Office Action", mailed on Nov. 17, 2023, 17 pages.
U.S. Appl. No. 18/459,340, "Non-Final Office Action", Jun. 5, 2024, 7 pages.
CN Application No. 202111583292.2, "Office Action", Jun. 12, 2024, 8 pages.
JP Application No. 2023-011789, "Notice of Decision to Grant", Mar. 19, 2024, 3 pages.
CA Application No. 3,128,719, "Office Action", Jul. 26, 2024, 7 pages.
CN Application No. 202111583292.2, "Notice of Decision to Grant", Sep. 9, 2024, 2 pages.
JP Application No. 2023-113488, "Office Action", Jul. 30, 2024, 8 pages.
U.S. Appl. No. 18/459,340, "Advisory Action", Nov. 13, 2024, 3 pages.
U.S. Appl. No. 18/459,340, "Final Office Action", Sep. 16, 2024, 9 pages.
U.S. Appl. No. 18/459,340, "Non-Final Office Action", Dec. 30, 2024, 7 pages.
CA Application No. 3,211,464, "Office Action", Nov. 19, 2024, 4 pages.
CA Application No. 3,211,436, "Office Action", Dec. 19, 2024, 4 pages.
CA Application No. 3,211,488, "Office Action", Dec. 17, 2024, 5 pages.
CA Application No. 3,211,514, "Office Action", Dec. 19, 2024, 4 pages.
JP Application No. 2023-113488, "Office Action", Jan. 7, 2025, 9 pages.

* cited by examiner

PRE-AGEING SYSTEMS AND METHODS USING MAGNETIC HEATING

CROSS REFERENCE TO RELATED APPLICATIONS

The present application is a divisional of U.S. Non-provisional patent application Ser. No. 15/716,577, filed on Sep. 27, 2017 and entitled "PRE-AGEING SYSTEMS AND METHODS USING MAGNETIC HEATING," now U.S. Pat. No. 11,479,837, issued Oct. 25, 2022, which claims the benefit of U.S. Provisional Patent Application No. 62/400,426 entitled "ROTATING MAGNET HEAT INDUCTION" and filed on Sep. 27, 2016, and U.S. Provisional Patent Application No. 62/505,948 entitled "ROTATING MAGNET HEAT INDUCTION" and filed on May 14, 2017, the disclosures of which are hereby incorporated by reference in their entireties.

Additionally, the present application is related to U.S. Non-provisional patent application Ser. No. 15/716,692 to David Anthony Gaensbauer et al., entitled "MAGNETIC LEVITATION HEATING OF METAL WITH CONTROLLED SURFACE QUALITY" filed Sep. 27, 2017, now, U.S. Pat. No. 10,837,090, issued Nov. 17, 2020, U.S. Non-provisional patent application Ser. No. 15/716,608 to David Anthony Gaensbauer et al., entitled "COMPACT CONTINUOUS ANNEALING SOLUTION HEAT TREATMENT" filed Sep. 27, 2017, now U.S. Pat. No. 10,844,467, issued on Nov. 24, 2020, and U.S. Non-provisional patent application Ser. No. 15/716,887 to Antoine Jean Willy Pralong et al., entitled "ROTATING MAGNET HEAT INDUCTION" filed Sep. 27, 2017, now U.S. Pat. No. 11,785,678, issued on Oct. 10, 2023, the disclosures of which are hereby incorporated by reference in their entireties.

FIELD OF THE INVENTION

This application relates to metal processing and, more particularly, systems and methods for pre-ageing treatment of a metal strip during metal processing.

BACKGROUND

In metal processing, it can be desirable to control the temperature of a metal product before, during, or after various processing steps. For example, it can be desirable to heat a metal strip prior to performing certain processes, or it can be desirable to maintain heat in a metal strip for a duration of time without allowing the metal strip to cool past a minimum temperature. Temperature control can generally involve adding or removing heat energy to or from a metal strip.

Various techniques for adding heat energy to a metal strip exist. Direct-contact techniques can induce undesirable effects on the metal strip, such as surface-marring, build-up of waste (e.g., carbon from indirect and/or direct-impingement flame) on the surface, or other such undesirable results. Other techniques attempt to heat up the metal strip without contact, but are unable to efficiently or rapidly transfer heat energy to the metal strip. Some other problems associated with current techniques include requiring high installation and/or maintenance costs, occupying significant production space, limiting the mobility of the metal strip being processed, and inducing undesirable effects on the metal strip.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a pre-ageing system includes a reheater. In various examples, the reheater includes a magnetic rotor. The reheater is configured to receive a metal strip adjacent to the magnetic rotor and to rotate the magnetic rotor to induce a magnetic field into the metal strip to heat the metal strip at a pre-ageing temperature.

According to certain examples, a method of pre-ageing a metal strip includes receiving a metal strip at a reheater. In various examples, the reheater includes a magnetic rotor. In some examples, the method includes passing the metal strip adjacent the magnetic rotor of the reheater and rotating the magnetic rotor to induce a magnetic field into the metal strip to heat the metal strip at a pre-ageing temperature.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
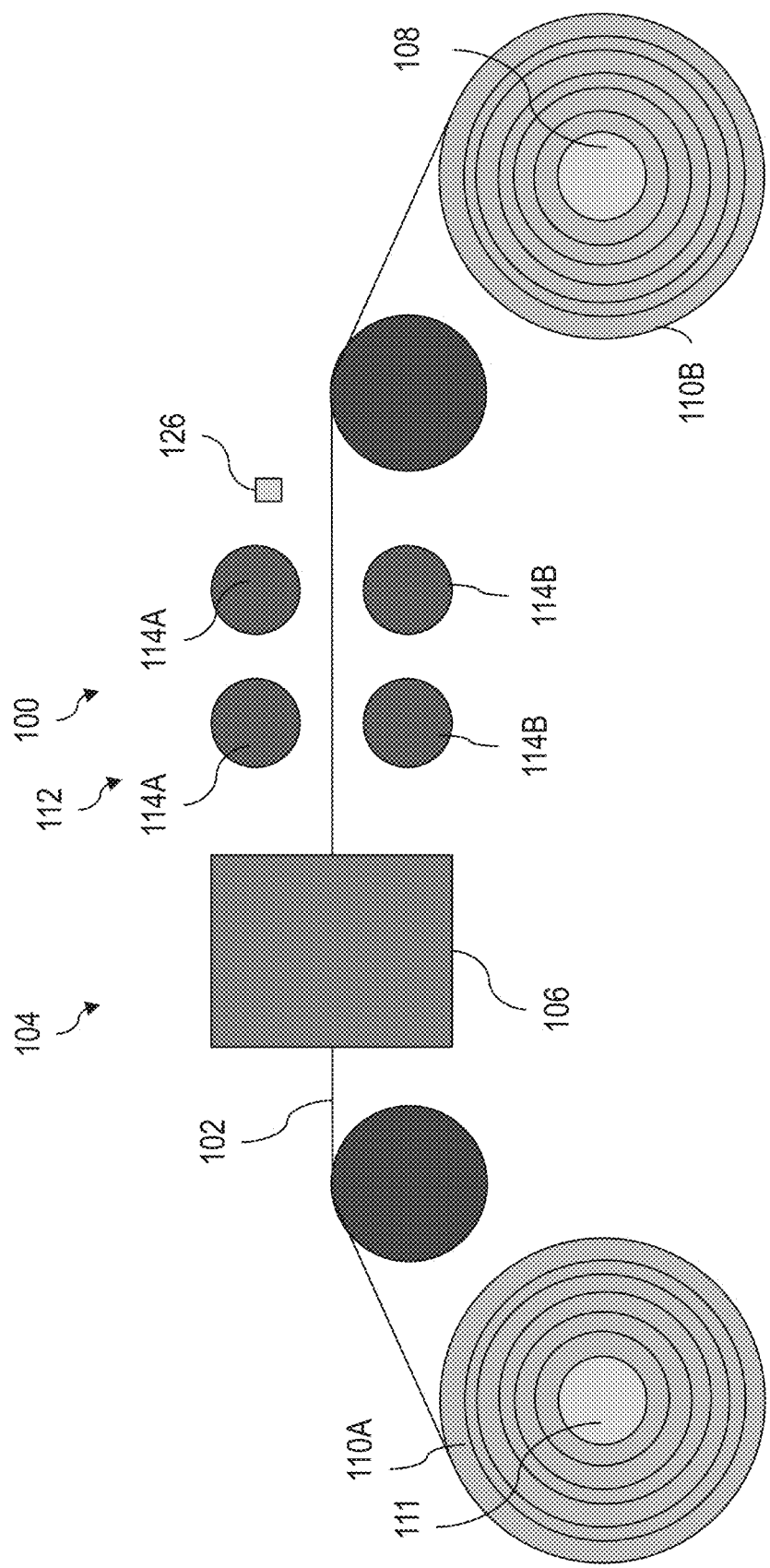
FIG. 1 is a side schematic view of a metal processing system including a pre-ageing system according to aspects of the current disclosure.

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

As used herein, the terms "above," "below," "vertical," and "horizontal" are used to describe relative orientations with respect to a metal strip as if the metal strip were moving in a horizontal direction with its top and bottom surfaces generally parallel to the ground. The term "vertical" as used herein can refer to a direction perpendicular to a surface (e.g., top or bottom surface) of the metal strip, regardless of the orientation of the metal strip. The term "horizontal" as used herein can refer to a direction parallel to a surface (e.g., top or bottom surface) of the metal strip, such as a direction parallel to the direction of travel of a moving metal strip, regardless of the orientation of the metal strip. The terms "above" and "below" can refer to locations beyond top or bottom surfaces of a metal strip, regardless of the orientation of the metal strip.

Disclosed are systems and methods for pre-ageing treatment of a metal strip using magnetic heating. Aspects and features of the present disclosure can be used with various suitable metal strips, and may be especially useful with metal strips of aluminum or aluminum alloys. Specifically, desirable results can be achieved when the metal strips are alloys such as 2xxx series, 6xxx series, 7xxx series, or 8xxx series aluminum alloys. For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

Pre-ageing treatment of a metal strip is generally used with various metal processing lines, such as continuous annealing solution heat treatment (CASH) line or other equipment. For example, on a CASH line, after a quenching step, the metal strip may undergo a pre-ageing treatment by reheating the metal strip with a reheater before coiling. By reheating the metal strip before coiling, better mechanical properties (e.g., maximum strength and hardness) can be obtained in the metal strip when the metal strip hardens, and thus may be more suitable for consumer use. In the CASH line, the reheaters are normally located in the non-continuous section of the CASH line. Because reheaters are in the non-continuous section, the metal strip must stop and start every time a coil of the metal strip is removed at a rewind coiler. Sometimes during the period when the metal strip is stopped, a traditional gas-powered reheater may overheat and damage a section of the metal strip that is stopped within the reheater. This overheated section of the metal strip must be cut out and discarded as scrap, and the overheated section can also cause damage to downstream rolls and/or the coil of the metal strip. Additionally, sometimes during reheating, the metal strip loses tension and contacts one or more nozzles of the traditional reheater. Such contact may cause the metal strip to wrinkle or distort, and may further cause wrinkles in the metal strip coiled at the rewind coiler that must be discarded as scrap.

Aspects and features of the present disclosure include pre-ageing systems and methods having a reheater that includes one or more magnetic rotors arranged above and/or below a moving metal strip to induce moving or time varying magnetic fields through the strip. The changing magnetic fields can create currents (e.g., eddy currents) within the metal strip, thus heating the metal strip.

In some cases, the magnetic rotors disclosed herein may be used with non-ferrous materials, including aluminum, aluminum alloys, magnesium, magnesium-based materials, titanium, titanium-based materials, copper, copper-based materials, steel, steel-based materials, bronze, bronze-based materials, brass, brass-based materials, composites, sheets used in composites, or any other suitable metal, non-metal or combination of materials. The article may include monolithic materials, as well as non-monolithic materials such as roll-bonded materials, clad materials, composite materials (such as but not limited to carbon fiber-containing materials), or various other materials. In one non-limiting example, the magnetic rotors can be used to heat metal articles such as aluminum metal strips, slabs or other articles made from aluminum alloys, including aluminum alloys containing iron.

Each magnetic rotor includes one or more permanent magnets or electromagnets. In some examples, a pair of matched magnetic rotors can be positioned on opposite sides of a passline of the metal strip. In other examples, one or more magnetic rotors are positioned above or below the passline. The magnetic rotors are rotatable in a forward direction or a reverse direction, and may be rotated through various suitable methods including, but not limited to, electric motors, pneumatic motors, another magnetic rotor, or various other suitable mechanisms. The direction and rotational speed of the magnetic rotors may be adjusted and controlled as needed. In some examples, the magnetic rotors are positioned a predetermined distance from the passline. In certain cases, the distance between the magnetic rotors and the passline may be adjusted and controlled as needed.

Precise heating control for pre-ageing treatment can be achieved when using the reheater. Such precise control can be achieved through manipulation of various factors, including strength of magnets in the rotor, number of magnets in the rotor, orientation of magnets in the rotor, size of magnets in the rotor, speed of the rotor, the direction of rotation in the forward direction or reverse direction, size of the rotor, vertical gap between vertically offset rotors in a single rotor set, laterally offset placement of rotors in a single rotor set, longitudinal gap between adjacent rotor sets, thickness of the strip being heated, distance between the rotor and the strip, forward speed of the strip being heated, and number of rotors sets used. Other factors can be controlled as well.

In some cases, the reheater is a fast response reheater because the rotation of the magnets may be stopped when the metal strip is stopped while a coil of the metal strip is removed at a rewind coiler to prevent overheating of the metal strip. In some cases, control of one or more of the aforementioned factors, among others, can be based on a computer model, operator feedback, or automatic feedback (e.g., based on signals from real-time sensors).

An example of a pre-ageing system 100 for pre-ageing treatment of a metal strip 102 during metal processing is illustrated in FIG. 1. In various examples, the pre-ageing system 100 may be used with a processing line 104. In various examples, the processing line 104 includes a rewind coiler 108 for winding the metal strip 102 into a coil 110B after metal processing. Optionally, the processing line 104 also includes an unwind coiler 111, which receives a coil 110A of the metal strip 102 that had previously been processed (e.g., through hot rolling, cold rolling, or various other metal processing techniques). In some examples, the processing line 104 optionally includes processing equipment 106, such as parts of a CASH line (e.g., furnaces, cooling units, or other equipment) or other suitable pieces of equipment. During metal processing, the metal strip 102 may be unwound from the unwind coiler 111, processed by the processing line 104, and then rewound onto the rewind coiler 108.

Figure 2:
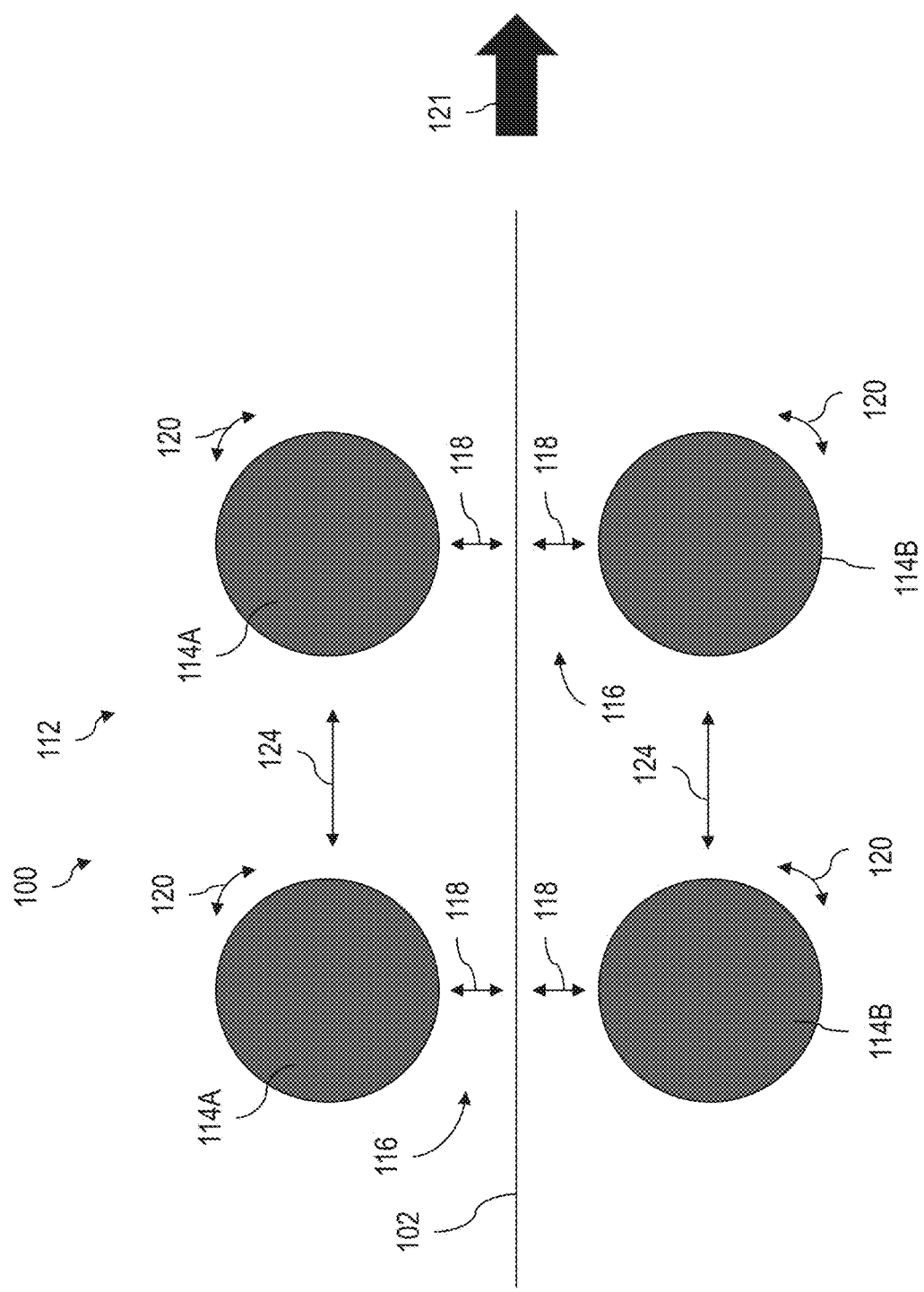
FIG. 2 is a side schematic view of the pre-ageing system of FIG. 1.
Figure 3:
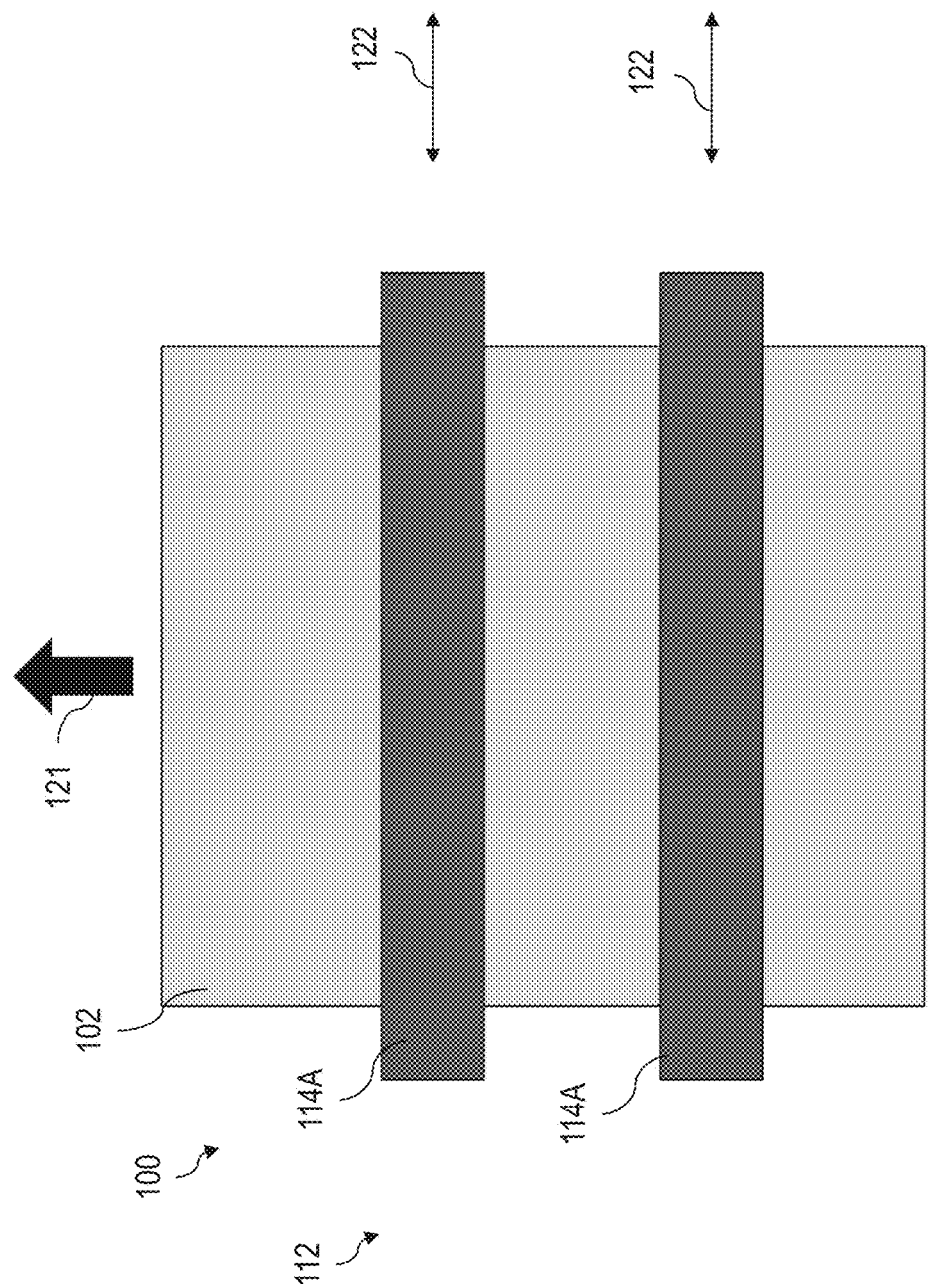
FIG. 3 is a top schematic view of the pre-ageing system of FIG. 1.

As illustrated in FIGS. 1-3, the pre-ageing system 100 includes a reheater 112 that is configured to heat the metal strip 102 before it is coiled on the rewind coiler 108. In some examples, the reheater 112 is configured to heat the metal strip 102 without contacting the metal strip 102. The reheater 112 may be orientated in various directions relative to the ground, such as vertically, diagonally, or horizontally, and is not limited to the orientation shown in FIGS. 1-3. For example, the reheater may be oriented vertically (and the metal strip 102 passes vertically through the reheater 112), diagonally (and the metal strip 102 passes through the reheater 112 at an angle relative to the ground), horizontally, or various other orientations or combinations of orientations.

In various examples, the reheater 112 includes at least one magnetic rotor 114, and in certain examples, the reheater 112 may include more than one magnetic rotor 114. For example, the reheater may include one magnetic rotor 114, two magnetic rotors 114, three magnetic rotors 114, four magnetic rotors 114, five magnetic rotors 114, six magnetic rotors 114, or more than six magnetic rotors 114. As such, the number of magnetic rotors 114 should not be considered limiting on the current disclosure. In the non-limiting example illustrated in FIG. 1, the reheater 112 includes four magnetic rotors 114.

Each magnetic rotor 114 includes one or more permanent magnets or electromagnets. The magnetic rotors 114 are rotatable (see arrows 120 in FIG. 2) in a forward direction (a clockwise direction in FIG. 1) or a reverse direction (a counter-clockwise direction in FIG. 1). In various examples, the magnetic rotors 114 may be rotated through various suitable methods including, but not limited to, electric motors, pneumatic motors, another magnetic rotor, or various other suitable mechanisms.

The magnetic rotors 114 are spaced apart from the passline of the metal strip 102 such that during metal processing, the magnetic rotors 114 are in a non-contacting configuration with the metal strip 102. In various examples, the magnetic rotors 114 are vertically adjustable such that a distance between a particular magnetic rotor 114 and the metal strip 102 (or passline of the metal strip 102) may be adjusted and controlled.

In some examples, the magnetic rotors 114 are provided as a set having a top magnetic rotor 114A positioned above the passline and a bottom magnetic rotor 114A positioned below the passline. In other examples, the reheater 112 includes only bottom magnetic rotors 114B, only top magnetic rotors 114A, or various combinations of top magnetic rotors 114A and bottom magnetic rotors 114B. In some examples, at least one top magnetic rotor 114A is horizontally aligned with a corresponding bottom magnetic rotor 114B, although it need not be. In certain examples, the top magnetic rotor 114A is vertically offset from a corresponding bottom magnetic rotor 114B such that a gap 116 (FIG. 2) is defined between the magnetic rotors 114A-B. As illustrated in FIGS. 1 and 2, during processing, the metal strip 102 is passed through the gap 116. In other cases, the top magnetic rotor 114A may be horizontally offset relative to a bottom magnetic rotor 114B.

In various examples, the top magnetic rotor 114A and the bottom magnetic rotor 114B are vertically adjustable such that a size of the gap 116, which is a distance from the top magnetic rotor 114A to the bottom magnetic rotor 114B, may be adjusted and controlled (see arrows 118 in FIG. 2). In various examples, the gap 116 may be controlled through various actuators including, but not limited to, hydraulic pistons, screw drives, or other suitable examples. In certain examples, the gap 116 may be varied between a minimum gap size and a maximum gap size. In some cases, the strength of the magnetic field, and thus the amount of heat imparted into the metal strip 102, may be controlled by changing the distance between the magnetic rotors 114 and the metal strip 102. In various examples, the top magnetic rotor 114A may be vertically adjustable independent from or in conjunction with the bottom magnetic rotor 114B. As mentioned above, the strength of the magnetic field, and thus the amount of heat imparted into the metal strip 102, can be adjusted in other or additional ways.

In certain examples, the magnetic rotors 114A-B may be adjusted laterally (see arrows 122 in FIG. 3). Lateral movement can control the percentage of the surface of the metal strip 102 covered by a particular rotor 114A-B, and therefore the amount and location of the heat imparted into the metal strip 102. In certain examples, the magnetic rotors 114A-B may be laterally adjusted to control the temperature profile in the metal strip 102. For example, in some cases, edges of the metal strip 102 may be heated more rapidly than non-edge portions of the metal strip 102, and the magnetic rotors 114A-B may be laterally adjusted such that the temperature variation in the metal strip 102 is reduced. In various examples, the magnetic rotors 114A-B may be longitudinally adjustable to control the gap between adjacent sets of magnetic rotors 114 (see arrows 124 in FIG. 2).

In some examples, the top magnetic rotor 114A and the bottom magnetic rotor 114B rotate in the same direction, although they need not. For example, in some cases, the top magnetic rotor 114A and the bottom magnetic rotor 114B may rotate in opposite directions. In various examples, the magnetic rotors 114A-B of one set of magnetic rotors may rotate in the same or in a different direction as the corresponding magnetic rotors 114A-B of another set of magnetic rotors. The magnetic rotors 114A-B may rotate at various rotational speeds, such as from about 100 rpm to about 5000 rpm. In one non-limiting example, the magnetic rotors 114A-B rotate at about 1800 revolutions per minute, although various other rotational speeds may be utilized.

As the magnetic rotors 114A-B rotate, the magnets induce a magnetic field into the metal strip 102 such that the metal strip 102 is heated. In various examples, through the rotation of the magnetic rotors 114, the reheater 112 is configured to heat the metal strip 102 as the metal strip 102 is passed through the reheater 112 at a pre-ageing temperature of from about 60° C. to about 150° C., such as from about 80° C. to about 120° C. For example, the reheater 112 may heat the metal strip 102 at a temperature of about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., or about 150° C. In certain examples, the strip 102 is heated to a target temperature only with no soak time in the reheater 112. The heated strip 102 is then rewound into coil form where it will cool naturally in still air. Pre-ageing occurs while the coil is at temperature and cooling while in coil form. In some examples, a conventional gas or other type of heating unit with the reheater 112 to assist with getting the temperature of the strip 102 uniform across the width because the more uniform the sheet temperature, the easier it may be to achieve uniform target properties across the width and along the length of the strip 102. In certain examples with multiple magnetic rotors 114A-B, the magnetic rotors 114A-B may optionally be controlled such that the amount of temperature rise of the metal strip 102 imparted by each magnetic rotor 114A-B is limited.

In some examples, in addition to heating the metal strip 102, rotating the magnetic rotors 114A-B may also provide vertical stabilization that allows the metal strip 102 to pass over and/or between the magnetic rotors 114 without contacting the magnetic rotors 114A-B (e.g., the magnetic rotors 114A-B levitate or float the metal strip 102). For example, in some cases, the magnetic rotors 114A-B impart a force that is perpendicular or substantially perpendicular to a surface of the metal strip 102 to float the metal strip 102 and minimize and/or eliminate contact between the rotors 114A-B and the metal strip 102.

In certain examples, the pre-ageing system 100 includes various sensors or monitors 126 at various positions relative to the reheater 112 and along the path of the metal strip 102. These sensors 126 may detect and monitor a position of the metal strip 102, movement of the metal strip 102, a temperature of the metal strip 102, a temperature distribution across the metal strip 102, and/or various other information about the metal strip 102 as it is processed. In some examples, the information gathered by the sensors may be used by a controller to adjust the magnetic rotors 114A-B (e.g., rotational speed, direction of rotation, distance from metal strip 102, etc.) and thereby control heating of the metal strip 102.

As one example, the reheater 112 may be controlled to reduce or prevent overheating of the metal strip 102 while the metal strip 102 is stopped. For example, the sensor or monitor 126 may detect when the metal strip 102 is moving through the reheater 112 and when movement of the metal strip 102 is stopped, such as when the coil 110B is removed from the rewind coiler 108. When the metal strip 102 is stopped, the magnetic rotors 114 of the reheater 112 may stop rotating (and thus stop heating the metal strip 102) to prevent overheating of the metal strip 102. Similarly, the magnetic rotors 114A-B may start rotating again (and thus start heating the metal strip 102 again) when the metal strip 102 is about to move or while the metal strip 102 is moving. Accordingly, through the magnetic rotors 114A-B, the reheater 112 may rapidly heat or stop heating the metal strip 102.

As another example, the reheater 112 may be controlled to ensure a uniform or desired temperature profile of the metal strip 102. In some examples, the temperature of the metal strip 102 for lubricant uniformity without degradation or migration depends on the lubricant. In one non-limiting example, the temperature of the metal strip without degradation or migration is from about 20° C. to about 100° C., although temperatures less than 20° C. or greater than 100° C. may be used. For example, the sensor or monitor 126 may detect a temperature and/or line speed of the metal strip 102 through the reheater 112. In another non-limiting example, the temperature of the metal strip 102 may be held at a set point temperature, such as from about 20° C. to about 45° C., to prevent potential degradation or migration. Based on the detected temperature and/or line speed, the magnetic rotors 114 may be controlled (e.g., by adjusting power input to the magnetic rotors 114, speed of the magnetic rotors 114A-B, distance of the magnetic rotors 114A-B from the metal strip 102, etc.) to control the temperature of the metal strip 102 and/or temperature across the metal strip 102. In some examples, a thermal model can be used to control various control variables of the reheater 112 to achieve a target strip temperature. Control variables of the reheater 112 include, but are not limited to, line speed, detected or modeled sheet temperature before and/or after the reheater 112, measured air temperature in the reheater 112, or various other variables.

As a further example, the reheater 112 may be controlled to accommodate different types of metal strips 102. For example, depending on the type of metal strip 102 and/or desired process or product requirements, the metal strip 102 may be passed through the reheater 112 at different speeds. By controlling the magnetic rotors 114A-B, the temperature can be changed more quickly than conventional reheaters.

In some examples, the reheater 112 may also be used to repair overaged solution heat treated products. Sometimes during metal processing, coils or blanks of the metal strip 102 may be stored for too long, which results in the metal strip 102 having high properties and low formability. Through the reheater 112, the metal strip 102 of the over-aged coils or blanks can be quickly reheated to temperatures above 540° C. or other suitable temperatures to resolutionize the metal strip 102 and reverse the over-ageing effect.

Figure 4:
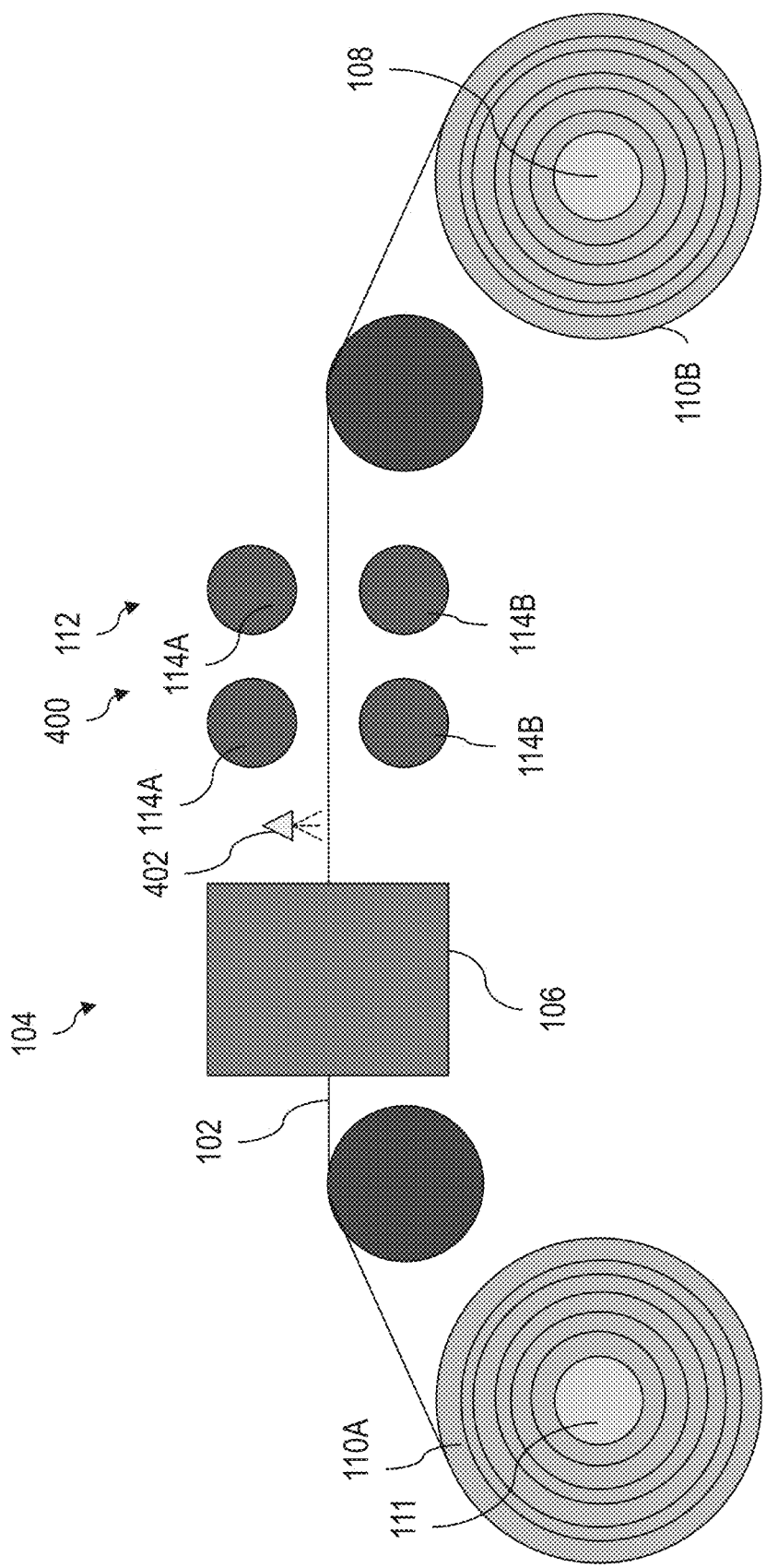
FIG. 4 is a side schematic view of a metal processing system including a pre-ageing system and a lubricant applicator according to aspects of the current disclosure.

FIG. 4 illustrates another example of a pre-ageing system 400. The pre-ageing system 400 is substantially similar to the pre-ageing system 400 except that the pre-ageing system 400 also includes a lubricant dispenser 402. The lubricant dispenser 402 is configured to apply a lubricant on the metal strip 102. Traditionally, lubricants have maximum temperature limits for application, and exposure to high temperatures can make the lubricants less effective. High temperatures also increase lubricant migration on the metal strip 102 such that the lubricant may not be uniformly applied on the metal strip 102. In traditional reheaters, the heating of the metal strip 102 must occur through the lubricant, and as such, the lubricants are heated. In the pre-ageing system 400, the magnetic rotors 114A-B heat the metal strip 102 without directly heating a lubricant on the metal strip 102 (e.g., the lubricant is only heated due to its contact with the metal strip 102 and not heated from the magnetic rotors). As such, the lubricant is heated to a lesser extent below the maximum temperature limits. In addition, because the lubricant is heated less than traditional systems, a more uniform or desired pattern of lubricant may be applied to the metal strip 102 through the lubricant dispenser 402. Additionally, if the lubricant (such as a dry film) is applied non-uniformly (for example the lubricant is applied as discrete droplets rather than a uniform film) by the applicator, the reheater 112 warming the metal strip 102 may also melt the droplets allowing them to flow to form a more uniform film of lubricant.

Figure 5:
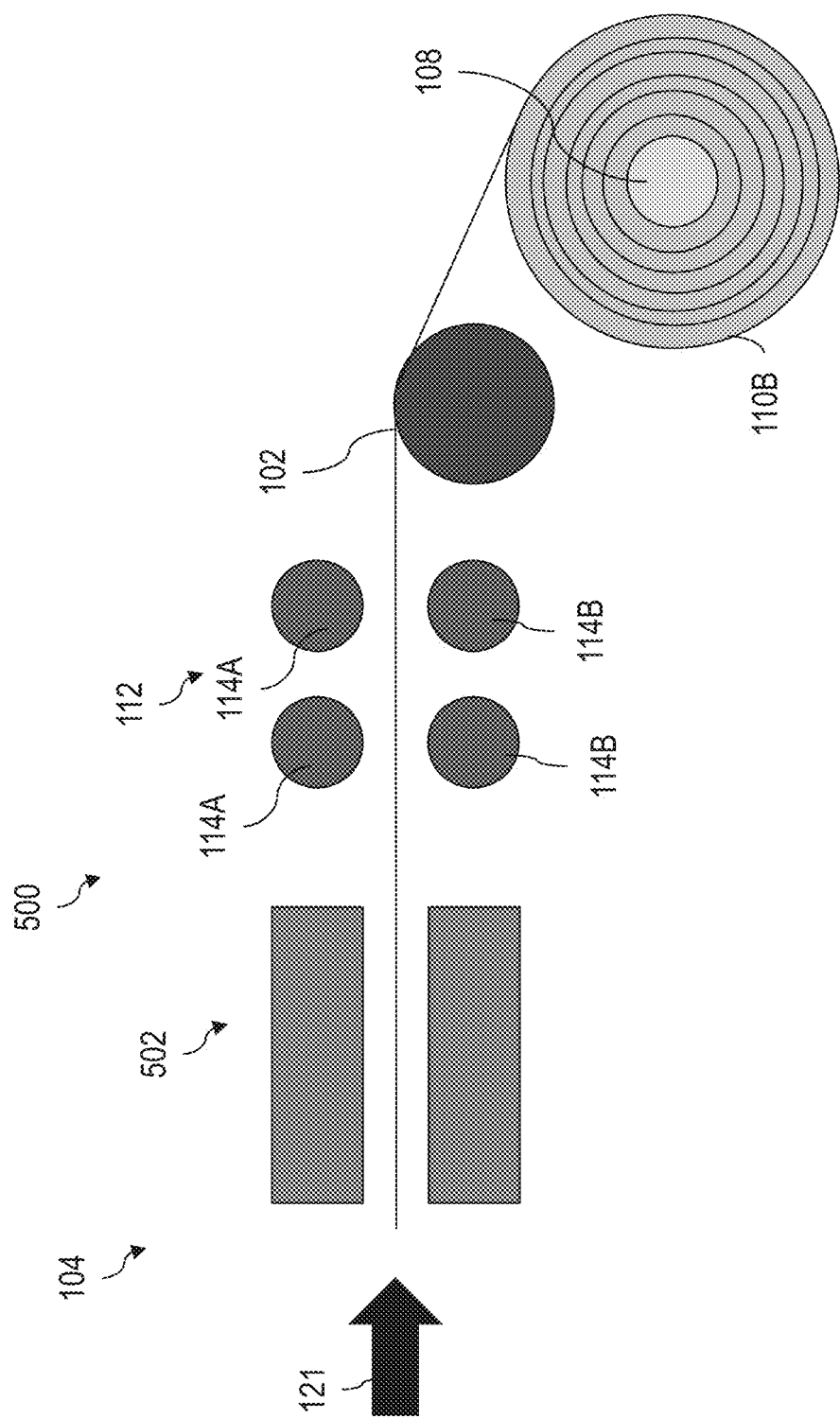
FIG. 5 is a side schematic view of a pre-ageing system according to aspects of the current disclosure.
Figure 6:
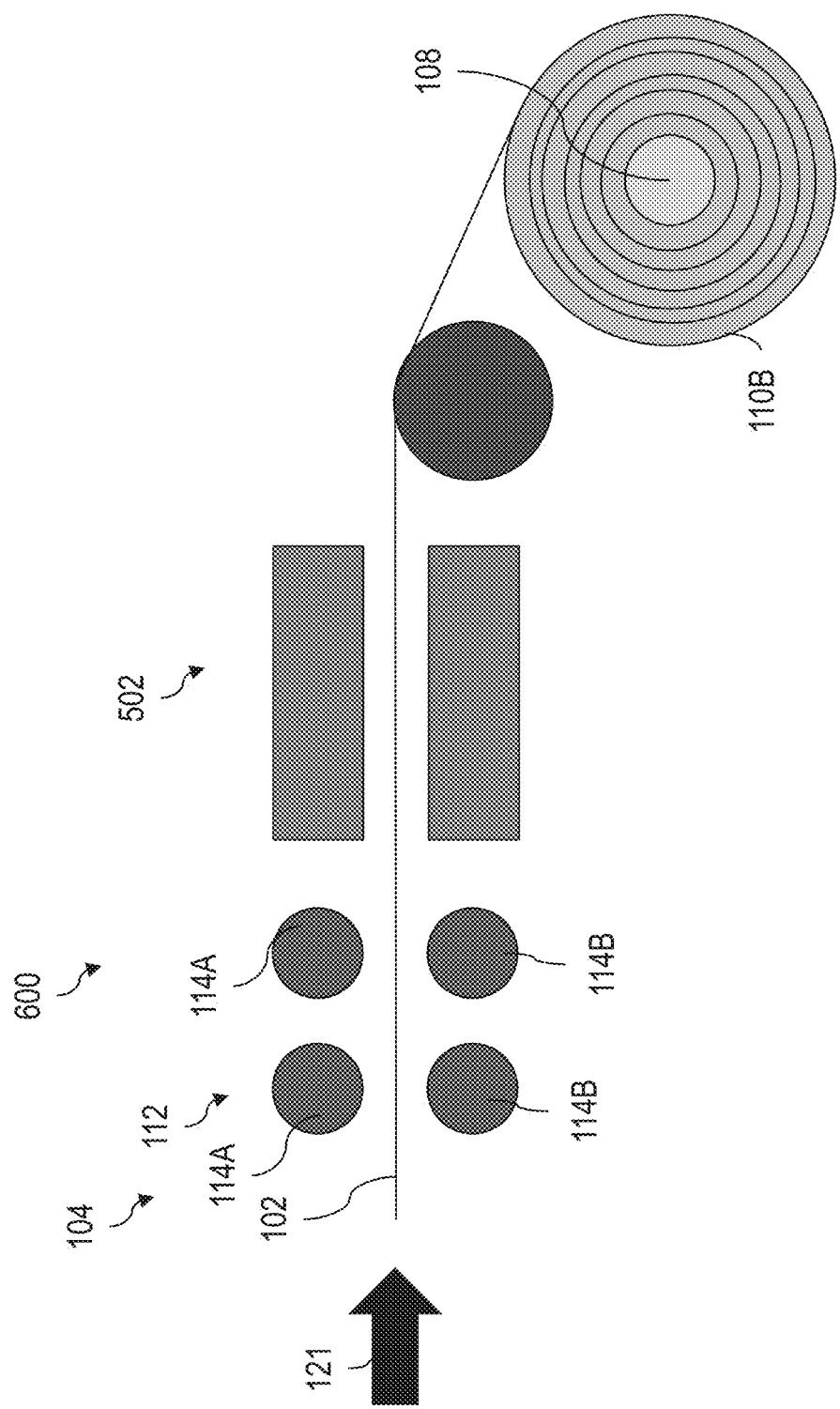
FIG. 6 is a side schematic view of a pre-ageing system according to aspects of the current disclosure.

FIGS. 5 and 6 illustrates another example of pre-ageing systems 500 and 600. The pre-ageing systems 500 and 600 are similar to the pre-ageing system 100 except that the pre-ageing systems 500 and 600 further include a second reheater 502. In some examples, the second reheater 502 is upstream from the reheater 112 (see FIG. 5). In other examples, the second reheater 502 is downstream from the reheater 112 (see FIG. 6). In various examples, the second reheater 502 may be configured to heat the metal strip 102 through non-magnetic heating. For example, the second reheater 502 may be a gas-powered reheater 502 (direct such as direct flame impingement or indirect), an infrared reheater 502, an induction reheater 502, or various other suitable types of heaters. In various other examples, the second reheater 502 may be similar to the reheater 112 and include one or more magnetic rotors 114. In certain examples, by providing the second reheater 502 with the reheater 112, the amount of temperature rise in the reheaters 112 and 502 can be limited. Limiting the temperature rise may improve the shape performance of the metal strip 102. As one non-limiting example, each reheater 112 and 502 may be configured to limit the amount of temperature rise to about 60° C. In other examples, the temperature rise limit may be less than 60° C. or greater than 60° C. In one non-limiting example, the temperature rise limit may be about 150° C. In other examples, the temperature rise limit may be greater than 150° C. In various examples, a lower temperature rise per reheater 112 or per magnetic rotor 114 may allow for better control and/or uniformity of temperature and better control and/or uniformity of shape while allowing for rapid or fast-acting change as needed.

Referring back to FIGS. 1-3, in various examples, a method of pre-ageing the metal strip 102 includes receiving the metal strip 102 at the reheater 112. In certain examples, the metal strip 102 is received at the reheater 112 after the metal strip has been rolled. In various examples, the metal strip 102 is received at the reheater 112 after the metal strip has been processed with the processing equipment 106. In one non-limiting example, the metal strip 102 is received at the reheater 112 after quenching on a CASH line.

In certain examples, the method includes passing the metal strip 102 adjacent one or more magnetic rotors 114 of the reheater 112 and rotating the one or more magnetic rotors 114 to induce a magnetic field into the metal strip 102 to heat the metal strip 102 at a pre-ageing temperature. In some examples, the pre-ageing temperature is from about 60° C. to about 150° C., such as from about 80° C. to about 100° C. In some cases, passing the metal strip 102 includes passing the metal strip through the gap 116 defined between the top magnetic rotor 114A and the bottom magnetic rotor 114B and rotating the magnetic rotors 114A-B. Optionally, in certain examples, the top magnetic rotor 114A and the bottom magnetic rotor 114B are horizontally offset.

In some examples, the method includes detecting or calculating through modeling a temperature of the metal strip 102, comparing the detected/calculated temperature to a predetermined temperature, and adjusting the magnetic rotor 114 to adjust the heating of the metal strip 102 such that the detected temperature matches the predetermined temperature. In various examples, adjusting the magnetic rotor 114 includes adjusting at least one of a rotational speed of the magnetic rotor 114, a vertical distance between the magnetic rotor 114 and the metal strip 102, a lateral position of the magnetic rotor 114, a speed of the metal strip 102, or a direction of rotation of the magnetic rotor 114.

In certain examples, the method includes detecting a line speed of the metal strip 102 through the reheater 112. In various cases, the line speed of the metal strip 102 may vary depending on the type of metal strip 102 being processed. In one non-limiting example, the line speed of the metal strip may be from about 1 m/min to about 100 m/min. In other examples, the line speed may be less than about 1 m/min or greater than about 100 m/min. In some cases, the method includes deactivating the magnetic rotor 114 when the line speed is equal to or less than a predetermined line speed or when a metal strip 102 or product which does not require pre-ageing or lubricant uniformity correction is run. In one non-limiting example, the predetermined line speed is 0 m/min, although various other line speeds may be used as the predetermined line speed. For example, in another non-limiting example, the predetermined speed may be 100 m/min if the metal strip 102 does not require use of the reheater 112. In some examples, deactivating the magnetic rotor 114 includes stopping the rotation of the magnetic rotor 114, moving the magnetic rotor 114 away from the metal strip 102 such that a magnetic field is not induced into the metal strip 102, or various other adjustments to stop heating the metal strip 102. In various examples, the method includes activating the magnetic rotor 114 when the line speed is greater than the predetermined line speed.

In some optional examples, the method includes applying a lubricant on the metal strip 102 before receiving the metal strip 102 at the reheater 112 as illustrated in FIG. 4. In some optional examples, the method includes passing the metal strip 102 through the second reheater 502. In certain examples, the metal strip 102 is passed through the second reheater 502 after heating the metal strip 102 with the reheater 112 or before heating the metal strip 102 with the reheater 112. In various examples, the method includes coiling the metal strip 102 on the rewind coiler 108 after heating the metal strip 102.

Figure 7:
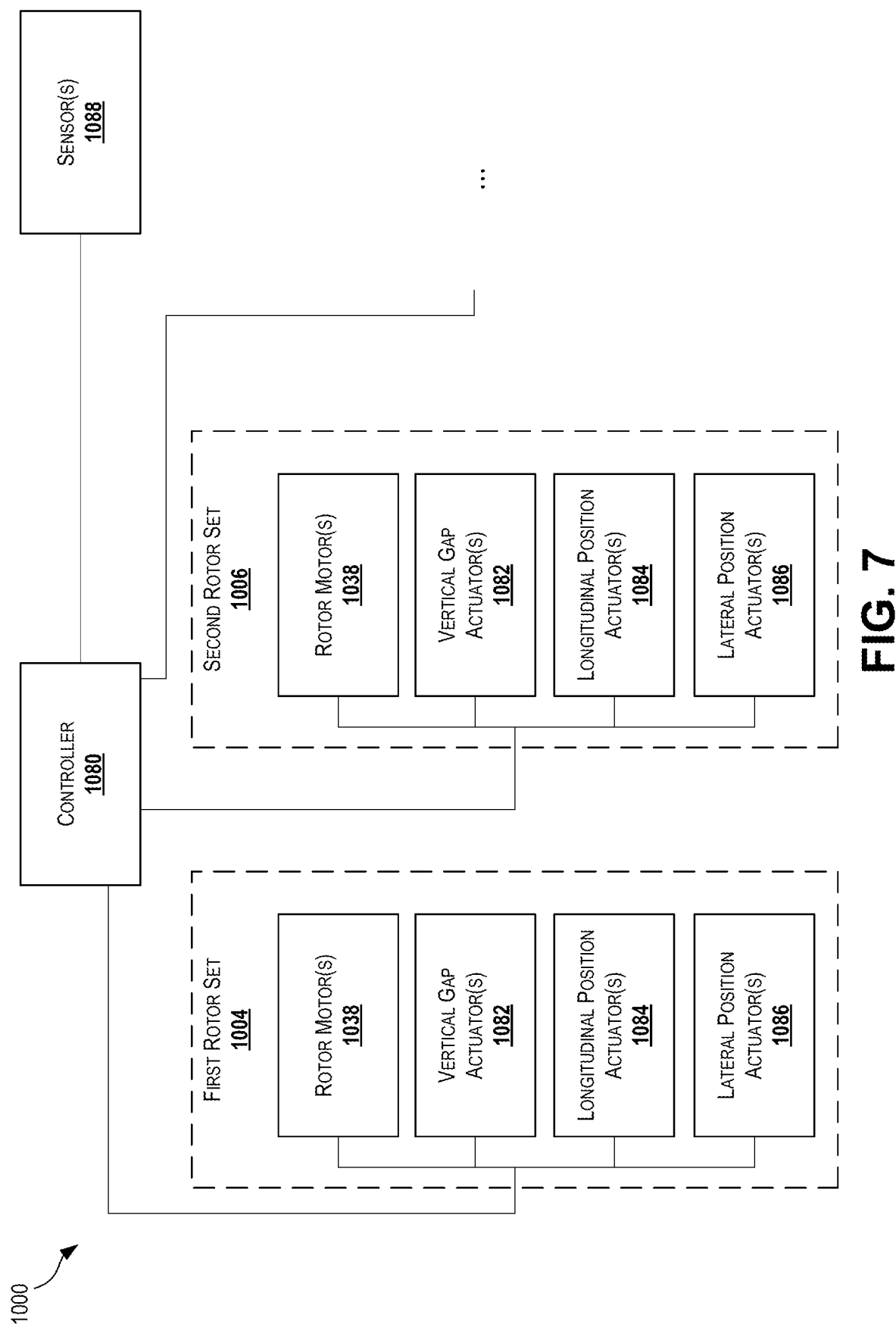
FIG. 7 is a schematic representation of a rotating magnet heater control system according to certain aspects of the present disclosure.

FIG. 7 is a schematic representation of a rotating magnet heater control system 1000 according to certain aspects of the present disclosure. A controller 1080 can be any suitable control equipment, such as a processor or computer. The controller 1080 can couple to various parts of the system 1000 to provide manual or automatic (e.g., programmed and/or dynamic) control of any controllable part of the system. Controller 1080 can be coupled to the rotor motor(s) 1038, vertical gap actuator(s) 1082 (e.g., rotor support arms), longitudinal position actuator(s) 1084, and/or lateral position actuator(s) 1086 of any number of rotor sets 1004, 1006 in order to provide proper control of the system 1000. Controller 1080 may be coupled to a data storage (e.g., a non-transitory, machine readable storage) for storing and accessing program information and other data.

In some cases, controller 1080 can be coupled to sensor(s) 1088. One or more sensors 1088 can be used to provide feedback to a display for a user to interpret, or can be used to provide dynamic control of one or more parts of the system 1000.

In an example, controller 1080 can use a sensor 1088 (e.g., a temperature sensor, a flatness sensor, or a tension sensor) to provide feedback to dynamically adjust the vertical gap (e.g., via vertical gap actuator(s) 1082) of the first rotor set 1004 to ensure that the tension induced by the first rotor set 1004 is compensated for by the second rotor set 1006. When a temperature sensor is used, the controller 1080 may correlate changes in temperature of the metal strip to an adjustment of vertical gap that is necessary to maintain a low, near zero, or zero net change in tension for the first and second rotor sets 1004, 1006. When a tension sensor is used, the measured tension itself can be used to control the vertical gap so that the net tension of the first and second rotor sets 1004, 1006 is low, near zero, or at zero.

In some cases, the controller 1080 or a suitable sensor 1088 can monitor the power usage associated with the rotor motors 1038. The power usage can provide insight into the operation of the system and can be used by the controller 1080 to make inferences about the state of the system. The controller 1080 can then provide feedback to dynamically adjust the system, such as described above (e.g., a vertical gap), based on the sensed power.

Figure 8:
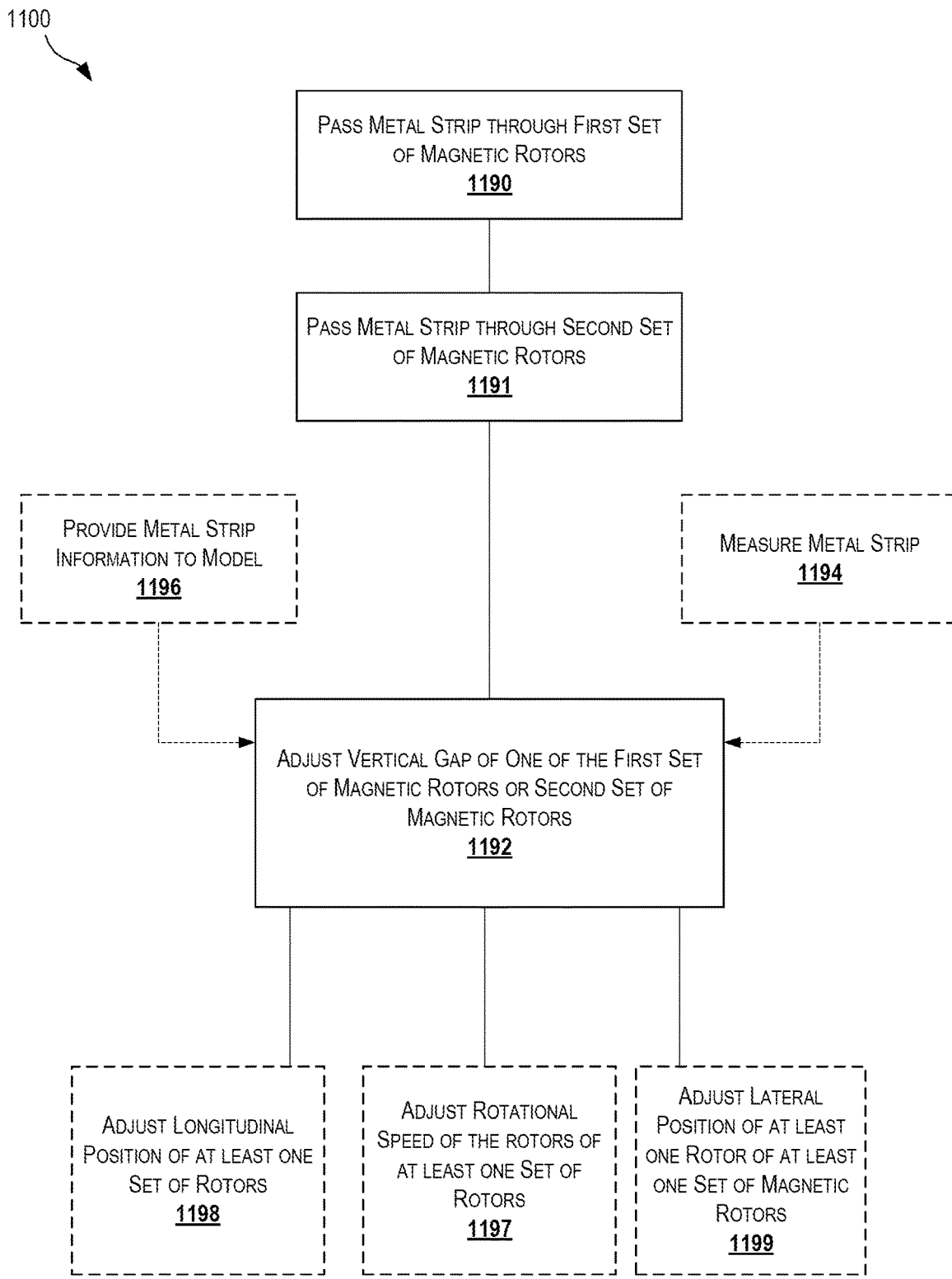
FIG. 8 is a flowchart depicting a process for using a rotating magnet heater according to certain aspects of the present disclosure.

FIG. 8 is a flowchart depicting a process 1100 for using a rotating magnet heater according to certain aspects of the present disclosure. At block 1190, a metal strip is passed through a first set of magnetic rotors. The metal strip can be passed through a first vertical gap between the first set of rotors. At block 1191, a metal strip can be passed through a second set of magnetic rotors. The metal strip can be passed through a second vertical gap between the second set of rotors.

At block 1192, a vertical gap of one of the first set of rotors or second set of rotors can be adjusted. The vertical gap can be increased or decreased as necessary to decrease or increase, respectively, the amount of tension induced in the metal strip by the adjusted rotor set. For example, if the first rotor set is applying too much downstream force to be compensated for by the second rotor set, the vertical gap of the first rotor set can be increased at block 1192 so that the first rotor set now applies less downstream force, which may be compensated for by the second rotor set. In some cases, block 1192 can be replaced by a block that adjusts a different parameter of the rotor set, such as rotational speed. In some cases, instead of adjusting a vertical gap, the distance adjacent the rotor can be adjusted.

At optional block 1196, information about the metal strip can be provided to a model. Such information can be information about the type of metal used, the dimensions of the metal strip, the speed of the metal strip, or any other characteristics of the metal strip. By applying this information to a model, the system may be able to determine the necessary vertical gap for the first or second rotor set at block 1192.

At optional block 1194, the system can take a measurement of the metal strip, such as a temperature measurement or a tension measurement. The measurement can be taken by any suitable sensor. The measurement can be used to provide dynamic feedback to adjust the vertical gap at block 1192 based on the measurement. For example, a measurement received at block 1194 of increasing tension in the metal strip can be used at block 1194 to adjust the vertical gap of one of the rotor sets to bring the tension back to desired levels.

At optional block 1198, a longitudinal position of at least one set of rotors can be adjusted. For example, the first rotor set can be longitudinally adjusted to move closer to or further away from the second rotor set.

At optional block 1199, a lateral position of at least one rotor of at least one set of magnetic rotors can be adjusted. In some cases, a lateral adjustment of one rotor of a set of magnetic rotors is accompanied by an equal and opposite lateral adjustment of an opposing rotor of the same set of rotors. For example, a top rotor that is laterally offset in a first direction towards a first edge of the metal strip can be accompanied by a bottom rotor of the same rotor set being laterally offset by the same amount in a second direction towards the second edge of the metal strip.

At optional block 1197, the rotational speed of the rotors of at least one set of rotors can be adjusted. The rotational speed can be adjusted to change the amount of heat energy imparted onto the moving metal strip. In some cases, the rotational speed of one set of rotors can be adjusted to provide control of the tension fluctuations between adjacent sets of rotors.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A method of pre-ageing a metal strip comprising: receiving a metal strip at a reheater, wherein the reheater comprises a magnetic rotor; passing the metal strip adjacent the magnetic rotor of the reheater; and rotating the magnetic rotor to induce a magnetic field into the metal strip to heat the metal strip at a pre-ageing temperature.

EC 2. The method of any of the preceding or subsequent example combination, wherein the metal strip is received at the reheater after the metal strip has been rolled.

EC 3. The method of any of the preceding or subsequent example combination, wherein the metal strip is received at the reheater after the metal strip has been quenched.

EC 4. The method of any of the preceding or subsequent example combination, wherein the magnetic rotor is a top magnetic rotor, wherein the reheater further comprises a bottom magnetic rotor vertically offset from the top magnetic rotor, wherein passing the metal strip adjacent a magnetic rotor comprises passing the metal strip through a gap defined between the top magnetic rotor and the bottom magnetic rotor, and wherein rotating the magnetic rotor comprises rotating the top magnetic rotor and the bottom magnetic rotor to heat the metal strip at the pre-ageing temperature.

EC 5. The method of any of the preceding or subsequent example combination, wherein the top magnetic rotor and the bottom magnetic rotor are horizontally offset.

EC 6. The method of any of the preceding or subsequent example combination, further comprising: detecting a temperature of the metal strip; comparing the detected temperature to a predetermined temperature; and adjusting the magnetic rotor to adjust the heating of the metal strip such that the detected temperature matches the predetermined temperature.

EC 7. The method of any of the preceding or subsequent example combination, wherein adjusting the magnetic rotor comprises adjusting at least one of a rotational speed of the magnetic rotor, a vertical distance between the magnetic rotor and the metal strip, a lateral position of the magnetic rotor, or a direction of rotation of the magnetic rotor.

EC 8. The method of any of the preceding or subsequent example combination, further comprising: detecting a line speed of the metal strip through the reheater; deactivating or adjusting the magnetic rotor when the line speed is equal to or less than a predetermined line speed; and activating or adjusting the magnetic rotor when the line speed is greater than the predetermined line speed.

EC 9. The method of any of the preceding or subsequent example combination, wherein the predetermined line speed is 0 m/s.

EC 10. The method of any of the preceding or subsequent example combination, wherein deactivating the magnetic rotor comprises stopping rotation of the magnetic rotor, and wherein activating the magnetic rotor comprises rotating the magnetic rotor.

EC 11. The method of any of the preceding or subsequent example combination, wherein the pre-ageing temperature is from about 60° C. to about 150° C.

EC 12. The method of any of the preceding or subsequent example combination, wherein the pre-ageing temperature is from about 80° C. to about 100° C.

EC 13. The method of any of the preceding or subsequent example combination, further comprising applying a lubricant on the metal strip before receiving the metal strip at the reheater.

EC 14. The method of any of the preceding or subsequent example combination, wherein the reheater is a first reheater, and wherein the method further comprises passing the metal strip through a second reheater.

EC 15. The method of any of the preceding or subsequent example combination, wherein the metal strip is passed through the second reheater after heating the metal strip with the first reheater.

EC 16. The method of any of the preceding or subsequent example combination, wherein the metal strip is passed through the second reheater before the metal strip is received at the first reheater.

EC 17. The method of any of the preceding or subsequent example combination, wherein the second reheater is configured to heat the metal strip through non-magnetic heating.

EC 18. The method of any of the preceding or subsequent example combination, wherein the second heater comprises a gas-powered reheater, an infrared reheater, or an induction reheater.

EC 19. The method of any of the preceding or subsequent example combination, further comprising coiling the metal strip on a rewind coiler after heating the metal strip.

EC 20. The method of any preceding or subsequent example combination, further comprising: determining a target property of the metal strip and whether the target property requires heating of the metal strip with the reheater; deactivating or controlling the magnetic rotor if the target property does not require heating of the metal strip; and activating or controlling the magnetic rotor if the target property requires heating of the metal strip.

EC 21. A pre-ageing system comprising: a reheater comprising a magnetic rotor, wherein the magnetic rotor is positioned a predetermined distance from a passline of a metal strip through the reheater, and wherein the reheater is configured to: receive a metal strip adjacent the magnetic rotor; and rotate the magnetic rotor to induce a magnetic field into the metal strip to heat the metal strip at a pre-ageing temperature.

EC 22. The pre-ageing system of any of the preceding or subsequent example combination, wherein at least one of a rotational speed of the magnetic rotor, a vertical distance between the magnetic rotor and the metal strip, a lateral position of the magnetic rotor, or a direction of rotation of the magnetic rotor is adjustable.

EC 23. The pre-ageing system of any of the preceding or subsequent example combination, wherein the magnetic rotor is a top magnetic rotor, wherein the reheater further comprises a bottom magnetic rotor vertically offset from the top magnetic rotor, and wherein the reheater is configured to: receive the metal strip through a gap defined between the top magnetic rotor and the bottom magnetic rotor; and rotate the top magnetic rotor and the bottom magnetic rotor to heat the metal strip at the pre-ageing temperature.

EC 24. The pre-ageing system of any of the preceding or subsequent example combination, wherein the top magnetic rotor is horizontally offset from the bottom magnetic rotor.

EC 25. The pre-ageing system of any of the preceding or subsequent example combination, further comprising a rewind coiler immediately downstream from the reheater.

EC 26. The pre-ageing system of any of the preceding or subsequent example combination, wherein the pre-ageing temperature is from about 60° C. to about 150° C.

EC 27. The pre-ageing system of any of the preceding or subsequent example combination, wherein the pre-ageing temperature is from about 80° C. to about 100° C.

EC 28. The pre-ageing system of any of the preceding or subsequent example combination, further comprising a lubricant dispenser upstream from the reheater, wherein the lubricant dispenser is configured to apply a lubricant on the metal strip upstream from the reheater. In other examples, the heat may be applied upstream from the lubricant dispenser, and the lubricant dispenser is configured to apply the lubricant after the metal strip has been heated. In some examples, heating the metal strip before application of the lubricant may help the lubricant flow and become uniform on the metal strip.

EC 29. The pre-ageing system of any of the preceding or subsequent example combination, wherein the reheater is a first reheater, and wherein the pre-ageing system further comprises a second reheater.

EC 30. The pre-ageing system of any of the preceding or subsequent example combination, wherein the second reheater is upstream from the first reheater.

EC 31. The pre-ageing system of any of the preceding or subsequent example combination, wherein the second reheater is downstream from the first reheater.

EC 32. The pre-ageing system of any of the preceding or subsequent example combination, wherein the second reheater is configured to heat the metal strip through non-magnetic heating.

EC 33. The pre-ageing system of any of the preceding or subsequent example combination, wherein the second heater comprises a gas-powered reheater, an infrared reheater, or an induction reheater.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A method of pre-ageing a metal strip comprising:
   receiving the metal strip at a reheater, wherein the reheater comprises a magnetic rotor;
   passing the metal strip adjacent the magnetic rotor of the reheater; and rotating the magnetic rotor to induce a magnetic field into the metal strip to heat the metal strip at a pre-ageing temperature without a soak time, wherein the pre-ageing temperature is from greater than 60° C. to 150° C.

2. The method of claim 1, wherein the metal strip is received at the reheater after the metal strip has been rolled.

3. The method of claim 1, wherein the magnetic rotor is a top magnetic rotor, wherein the reheater further comprises a bottom magnetic rotor vertically offset from the top magnetic rotor, wherein passing the metal strip adjacent the magnetic rotor comprises passing the metal strip through a gap defined between the top magnetic rotor and the bottom magnetic rotor, and wherein rotating the magnetic rotor comprises rotating the top magnetic rotor and the bottom magnetic rotor to heat the metal strip at the pre-ageing temperature.

4. The method of claim 3, wherein the top magnetic rotor and the bottom magnetic rotor are horizontally offset.

5. The method of claim 1, further comprising:
detecting or modelling a temperature of the metal strip;
comparing the detected or modeled temperature to a predetermined temperature; and
adjusting the magnetic rotor to adjust the heating of the metal strip such that the detected temperature matches the predetermined temperature.

6. The method of claim 5 wherein adjusting the magnetic rotor comprises adjusting at least one of a rotational speed of the magnetic rotor, a vertical distance between the magnetic rotor and the metal strip, a lateral position of the magnetic rotor, or a direction of rotation of the magnetic rotor.

7. The method of claim 1, further comprising:
detecting a line speed of the metal strip through the reheater;
deactivating or controlling the magnetic rotor when the line speed is equal to or less than a predetermined line speed; and
activating or controlling the magnetic rotor when the line speed is greater than the predetermined line speed.

8. The method of claim 1, further comprising:
determining a target property of the metal strip and whether the target property requires heating of the metal strip with the reheater;
deactivating or controlling the magnetic rotor if the target property does not require heating of the metal strip; and
activating or controlling the magnetic rotor if the target property requires heating of the metal strip.

9. The method of claim 1, wherein the reheater is a first reheater, and wherein the method further comprises passing the metal strip through a second reheater.

10. The method of claim 9, wherein the metal strip is passed through the second reheater after heating the metal strip with the first reheater or before the metal strip is received at the first reheater.

11. The method of claim 9, wherein the second reheater is configured to heat the metal strip through non-magnetic heating.

12. The method of claim 11, wherein the second reheater comprises a gas-powered reheater, infrared reheater, or an induction reheater.

13. A method of pre-ageing a metal strip comprising:
receiving the metal strip at a reheater, wherein the reheater comprises a magnetic rotor rotatable about an axis that does not intersect the metal strip;
passing the metal strip adjacent the magnetic rotor of the reheater at a line speed greater than 0 m/min;
rotating the magnetic rotor to induce a magnetic field into the metal strip to heat the metal strip at a pre-ageing temperature of greater than 60° C. to 150° C. and while the metal strip is moving by the magnetic rotor at the line speed.

14. The method of claim 13, wherein the line speed is at least 1 m/min.

15. A method of pre-ageing a metal strip comprising:
receiving the metal strip at a reheater, wherein the reheater comprises a magnetic rotor rotatable about an axis extending parallel to a passline of the metal strip through the reheater;
passing the metal strip adjacent the magnetic rotor of the reheater;
receiving an operating parameter of the metal strip;
rotating the magnetic rotor to induce a magnetic field into the metal strip to heat the metal strip at a pre-ageing temperature of greater than 60° C. to 150° C. and controlling heating from the magnetic rotor based on the operating parameter, wherein controlling heating comprises controlling at least one of a speed of the rotor, a direction of rotation of the rotor, or a distance between the magnetic rotor and the metal strip.

16. The method of claim 15, wherein the operating parameter comprises a line speed of the metal strip and/or a temperature of the metal strip.

17. The method of claim 15, wherein the operating parameter comprises at least one of longitudinal movement of the metal strip, a property of the metal strip, or a type of metal of the metal strip.

* * * * *